US008111322B2

(12) United States Patent
Kaneda

(10) Patent No.: US 8,111,322 B2
(45) Date of Patent: Feb. 7, 2012

(54) IMAGING APPARATUS WITH INTERCHANGEABLE LENS APPARATUS, THE LENS APPARATUS HAVING A MEMORY FOR STORING OPTICAL PERFORMANCE DATA OF THE LENS APPARATUS

(75) Inventor: Naoya Kaneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 11/277,297

(22) Filed: Mar. 23, 2006

(65) Prior Publication Data

US 2006/0176389 A1  Aug. 10, 2006

Related U.S. Application Data

(62) Division of application No. 10/015,750, filed on Dec. 17, 2001, now Pat. No. 7,151,570.

(30) Foreign Application Priority Data

Dec. 21, 2000  (JP) .................................. 2000-389172

(51) Int. Cl.
H04N 5/238 (2006.01)
(52) U.S. Cl. ........................................ 348/363; 348/360
(58) Field of Classification Search ............... 348/240.1, 348/240.2, 240.3, 240.99, 335, 360, 231.6, 348/239, 208.99, 208.1, 208.4, 208.5, 208.6, 348/208.12, 208.13, 208.16, 345, 362, 363
See application file for complete search history.

(56) References Cited

U.S. PATENT DOCUMENTS

| 4,910,600 | A | * | 3/1990 | Kondo | 348/221.1 |
|---|---|---|---|---|---|
| 4,975,726 | A | * | 12/1990 | Kuga et al. | 396/101 |
| 5,003,399 | A | | 3/1991 | Ishimaru et al. | 348/361 |
| 5,010,357 | A | | 4/1991 | Misawa | 396/72 |
| 5,040,068 | A | * | 8/1991 | Parulski et al. | 348/376 |
| 5,087,978 | A | * | 2/1992 | Hieda | 348/363 |
| 5,126,780 | A | * | 6/1992 | Satou et al. | 396/63 |
| 5,293,208 | A | * | 3/1994 | Okano et al. | 355/55 |
| 5,349,409 | A | | 9/1994 | Kawasaki et al. | 396/87 |
| 5,392,082 | A | * | 2/1995 | Ikemori et al. | 396/89 |
| 5,483,280 | A | * | 1/1996 | Takahashi et al. | 348/296 |
| 5,502,484 | A | * | 3/1996 | Okada | 348/208.6 |

(Continued)

FOREIGN PATENT DOCUMENTS

JP       01-321416       12/1989

(Continued)

*Primary Examiner* — Lin Ye
*Assistant Examiner* — Chriss Yoder, III
(74) *Attorney, Agent, or Firm* — Fitzpatrick, Cella, Harper & Scinto

(57) ABSTRACT

An optical apparatus including an imaging apparatus and a lens apparatus each having a communicating portion performing communications is disclosed. The optical apparatus is provided with: an imaging optical unit; a memory in which information of an optical performance of the imaging optical unit is stored; an image pickup device imaging a subject image from the imaging optical unit; an imaging controller changing an information size of image information from the image pickup device; and a lens controller connected to the imaging controller through the communicating portions and performing communications with the imaging controller. The lens controller takes out the information of the optical performance from the memory in response to an instruction from the imaging controller, and transmits the information to the imaging controller through the communicating portions. The imaging controller changes the information size of the image information in accordance with the information of the optical performance from the lens controller.

6 Claims, 13 Drawing Sheets

U.S. PATENT DOCUMENTS

| | | | | |
|---|---|---|---|---|
| 5,532,782 | A | 7/1996 | Mori et al. | 354/402 |
| 5,587,766 | A | 12/1996 | Kawamura et al. | 396/257 |
| 5,812,189 | A * | 9/1998 | Kimura et al. | 348/240.99 |
| 5,845,156 | A * | 12/1998 | Onuki | 396/52 |
| 5,867,213 | A * | 2/1999 | Ouchi | 348/208.5 |
| 5,895,133 | A | 4/1999 | Hirai | 396/238 |
| 5,959,669 | A * | 9/1999 | Mizoguchi et al. | 348/362 |
| 6,069,651 | A * | 5/2000 | Tsuyuki et al. | 348/75 |
| 6,111,608 | A * | 8/2000 | Koizumi et al. | 348/342 |
| 6,130,994 | A * | 10/2000 | Maruyama | 396/60 |
| 6,134,389 | A * | 10/2000 | Nakayama et al. | 396/73 |
| 6,172,707 | B1 * | 1/2001 | Ouchi et al. | 348/208.6 |
| 6,204,880 | B1 * | 3/2001 | Nishimura | 348/240.99 |
| 6,639,629 | B1 * | 10/2003 | Takayama et al. | 348/364 |
| 6,650,367 | B1 * | 11/2003 | Kyuma | 348/240.1 |
| 6,720,995 | B1 * | 4/2004 | Kaneda et al. | 348/208.8 |
| 6,992,720 | B2 * | 1/2006 | Kaneda | 348/363 |
| 7,098,955 | B2 * | 8/2006 | Koyama et al. | 348/363 |
| 7,471,331 | B2 * | 12/2008 | Kaneda | 348/363 |
| 7,477,314 | B2 * | 1/2009 | Nanjo et al. | 348/363 |
| 2001/0003464 | A1 * | 6/2001 | Niikawa | 348/341 |
| 2001/0030707 | A1 * | 10/2001 | Fujii | 348/335 |
| 2002/0097324 | A1 | 7/2002 | Onuki | 348/208 |
| 2002/0171750 | A1 | 11/2002 | Kato | 348/345 |
| 2003/0011692 | A1 | 1/2003 | Shore et al. | 348/240.3 |
| 2004/0028401 | A1 | 2/2004 | Nonaka | 396/121 |
| 2006/0092289 | A1 * | 5/2006 | Kawahara | 348/222.1 |

FOREIGN PATENT DOCUMENTS

| | | |
|---|---|---|
| JP | 11-275431 | 10/1999 |
| JP | 2000-221557 | 8/2000 |
| JP | 2000-241868 | 9/2000 |

\* cited by examiner

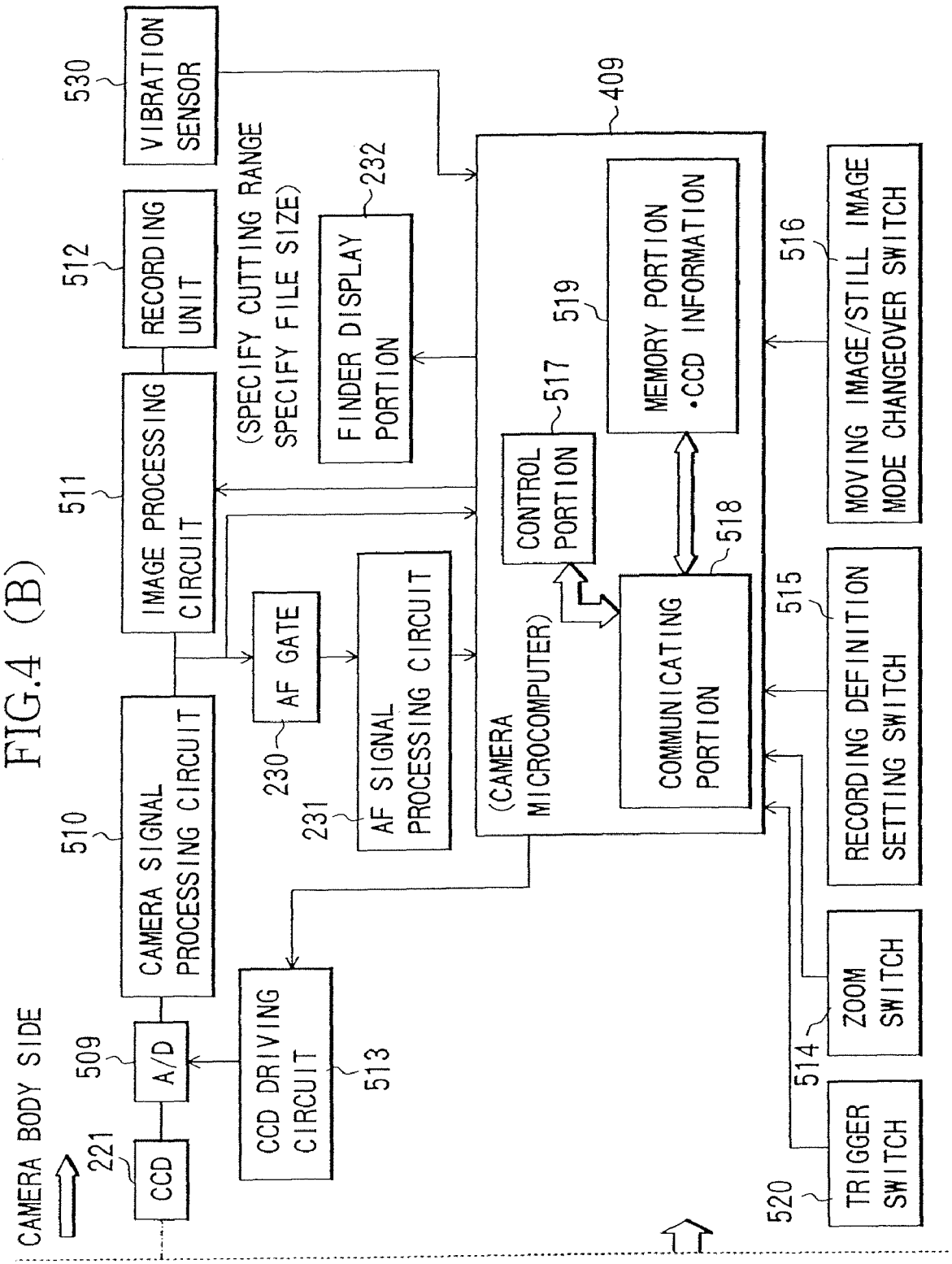

(a)

(b)

(c)

(d)

(e)

IMAGING APPARATUS WITH INTERCHANGEABLE LENS APPARATUS, THE LENS APPARATUS HAVING A MEMORY FOR STORING OPTICAL PERFORMANCE DATA OF THE LENS APPARATUS

This application is a division of application Ser. No. 10/015,750 filed Dec. 17, 2001 now U.S. Pat. No. 7,151,570.

BACKGROUND OF THE INVENTION

1. Field of the Invention

The present invention relates to an optical apparatus, and more specifically, to an optical apparatus comprising an imaging apparatus having an image pickup device, a lens apparatus interchangeably attached to an imaging apparatus, and the imaging apparatus to which the lens apparatus is attached.

2. Description of the Related Art

A zoom lens system conventionally used for video cameras will be described.

Examples of zoom lens systems for video cameras include a four-component lens system comprising from the subject side a stationary positive lens component, a movable negative lens component, a stationary positive lens component and a movable positive lens component.

FIGS. 8(A) and 8(B) show the lens barrel structure of a general four-component zoom lens system. FIG. 8(B) shows a cross section taken on the line A-A of FIG. 8(A).

The four lens components 201a to 201d constituting this zoom lens system are a stationary front lens 201a, a variator lens component 201b moving along the optical axis to thereby perform zooming, a stationary afocal lens 201c, and a focusing lens component 201d moving along the optical axis to thereby maintain the focal plane during zooming and perform focusing.

Guide bars 203, 204a and 204b which are disposed parallel to an optical axis 205 guide the movable lens components and prevent the movable lens components from rotating. A DC motor 206 serves as the driving source for moving the variator lens component 201b.

The front lens 201a is held by a front lens barrel 202. The variator lens component 201b is held by a variator moving ring 211. The afocal lens 201c is held by an intermediate frame 215. The focusing lens component 201d is held by a focus moving ring 214.

The front lens barrel 202 is fixed to a rear barrel 216 so as to be positioned. By the barrels 202 and 216, the guide bar 203 is supported so as to be positioned, and a guide screw shaft 208 is supported so as to be rotatable. The guide screw shaft 208 is rotated by the rotation of an output shaft 206a of the DC motor 206 being transmitted through a gear train 207.

The variator moving ring 211 holding the variator lens component 201b has a presser bar spring 209, and a ball 210 engaging with a screw groove 208a formed on the guide screw shaft 208 by the force of the presser bar spring 209. By the guide screw shaft 208 being rotated by the DC motor 206, the variator moving ring 211 moves backward and forward in the direction of the optical axis while guided and rotation-restricted by the guide bar 203.

The guide bars 204a and 204b are supported by being engaged with the rear barrel 216 and the intermediate frame 215 positioned by the rear barrel 216. The focus moving ring 214 is movable backward and forward in the direction of the optical axis while guided and rotation-restricted by the guide bars 204a and 204b.

A stop unit 235 (stop driving source 224) is fixed to the intermediate frame 215.

The focus moving ring 214 holding the focusing lens component 201d has a sleeve slidably engaged with the guide bars 204a and 204b. A rack 213 is attached so as to be integral with the focus moving ring 214 with respect to the direction of the optical axis.

A stepping motor 212 rotates a lead screw 212a integrally formed on the output shaft thereof. The rack 213 attached to the focus moving ring 214 is engaged with the lead screw 212a, and by the lead screw 212a rotating, the focus moving ring 214 moves in the direction of the optical axis while guided by the guide bars 204a and 204b.

As the driving source of the variator lens component, a stepping motor may be used like the driving source of the focusing lens component.

A lens barrel body in which the lens components and the like are substantially enclosed is constituted by the front lens barrel 202, the intermediate frame 215 and the rear barrel 216.

When a lens component holding frame is moved by use of a stepping motor as described above, it is detected that the holding frame is situated at one reference position in the direction of the optical axis by use of a photo interrupter or the like, and then, the absolute position of the holding frame is detected by continuously counting the number of driving pulses supplied to the stepping motor.

Next, the electric structure of a conventional imaging apparatus will be described with reference to FIG. 9. In this figure, the members of the lens barrel described with reference to FIGS. 8(A) and 8(B) are designated by the same reference numerals as those of FIGS. 8(A) and 8(B).

Reference numeral 221 shows a solid state image pickup device such as a CCD. Reference numeral 222 shows a driving source of the variator lens component 201b including the motor 206 (or a stepping motor), the gear train 207 and the guide screw shaft 208.

Reference numeral 223 shows the driving source of the focusing lens component 201d including the stepping motor 212, the lead screw shaft 212a and the rack 213.

Reference numeral 224 shows the driving source of the diaphragm unit 235 disposed between the variator lens component 201b and the afocal lens 201c.

Reference numeral 225 shows a zoom encoder. Reference numeral 227 shows a focus encoder. The encoders 225 and 227 detect the absolute positions, in the direction of the optical axis, of the variator lens component 201b and the focusing lens component 201d, respectively. When a DC motor is used as the variator driving source as shown in FIGS. 8(A) and 8(B), an absolute position encoder such as a volume or a magnetic encoder is used.

When a stepping motor is used as the driving source, it is common practice to situate the holding frame at a reference position as mentioned above and then, continuously count the number of operation pulses input to the stepping motor.

Reference numeral 226 shows a stop encoder. As the stop encoder 226, for example, a type is used in which a Hall element is disposed in the stop driving source 224 such as a motor and the relationship between the rotation positions of the rotor and the stator is detected.

Reference numeral 232 shows a CPU controlling the camera. Reference numeral 228 shows a camera signal processing circuit performing predetermined amplification and gamma correction on the output of the solid-state image pickup device 221. The contrast signal of the image signal having undergone these predetermined processings passes through an AE gate 229 and an AF gate 230. That is, of the entire image plane, a signal extraction range optimum for deciding exposure and focusing is set by the gates. There are cases where these gates are variable in size and where a plurality of gates are provided.

Reference numeral 231 shows an AF (autofocus) signal processing circuit processing an AF signal for AF. The AF signal processing circuit 231 generates one output or more associated with the high-frequency component of the image signal. Reference numeral 233 shows a zoom switch. Reference numeral 234 shows a zoom tracking memory. In the zoom tracking memory 234, information of the focusing lens position to be set according to the subject distance and the variator lens position in zooming is stored. A memory in the CPU 232 may be used as the zoom tracking memory.

For example, when the zoom switch 233 is operated by the user, in order that the predetermined positional relationship between the variator lens and the focusing lens calculated based on the information in the zoom tracking memory 234 is maintained, the CPU 232 drives the zoom driving source 222 and the focusing driving source 223 so that the current absolute position of the variator lens in the direction of the optical axis and the calculated position at which the variator lens is to be set for which the positions are a result of the detection by the zoom encoder 225 are the same as the current absolute position of the focusing lens in the direction of the optical axis and the calculated position at which the focusing lens is to be set for which the positions are a result of the detection by the focus encoder 227.

In automatic focusing, the CPU 232 drives the focusing driving source 223 so that the output of the AF signal processing circuit 231 is at its peak.

Further, to obtain correct exposure, the CPU 232 controls the aperture diameter by driving the diaphragm driving source 224 so that the output of the diaphragm encoder 226 is a predetermined value which is the average value of the outputs of the Y signals having passed through the AE gate 229.

Next, an AF method using a TV signal will be described. Here, the above-described automatic focusing will be described in more detail. This method which uses the image pickup device of the imaging apparatus also as a sensor for performing automatic focusing is advantageous in cost because the number of parts is small compared to a case where a separate AF sensor is provided. Moreover, since the condition of the image on the imaging surface is directly detected, for example, even when lens barrel parts expand or contract due to a temperature change and this changes the focus position, the correct focus position can be detected according to the change.

FIG. 10 shows the principle of the TV-AF method. In the graph of FIG. 10, the horizontal axis shows the lens component position for focusing, and the vertical axis shows the high-frequency component (focus voltage) of the image sensing signal. In the figure, the peak of the focus voltage is reached at the position A shown by the arrow. The position A is the lens position where the subject is in focus.

An example of a method for obtaining the focus voltage F will be described. FIG. 11(A) shows an actual image sensing field. Reference numeral 720 shows an angle of view. Reference numeral 718 shows an image signal extraction range for automatic focusing. Reference numeral 719 shows a subject image.

In FIG. 11(B), (a) shows the subject image within the image signal extraction range, and (b) shows an image signal (Y signal) of the subject image shown in (a).

Differentiating this signal, a waveform as shown in (c) is obtained, and converting it to an absolute value, (d) is obtained.

The signal (e) obtained by sampling and holding the signal (d) is the focus voltage E. This method uses the fact that, of the contrast signal of the subject image, a high-frequency component is highest when the subject is in focus. Various other methods are known as the method for producing the focus voltage.

Although a bypass filter for extracting only a high-frequency component is frequently used, it is also known to provide some kinds of properties of this filter, produce the focus voltage for a plurality of frequencies and ensure correct focus based on these pieces of information.

FIG. 12 shows the structure of a camera in which this automatic focusing apparatus is combined with an inner focusing lens.

At the imaging position designated by 805, an image pickup device such as a CCD is disposed. A luminance signal Y is produced through the image pickup device, and the information within the predetermined frame 718 (FIG. 11(A)) is taken into an AF circuit 821.

The AF circuit 821 obtains the focus voltage by the above-described method or the like, and determines whether the subject is in focus or out of focus, when the subject is out of focus, whether the blur is caused because the camera is focused on the background or on the foreground based on the obtained focus voltage, and the driving direction of a focusing lens 804B and the sign of the change of the focus voltage caused by the driving. Based on the result of the determination, the AF circuit 821 drives a focusing lens driving motor 822 in a predetermined direction.

According to a method as described above called TV signal automatic focusing, since the sensor which is an imager of the imaging apparatus is used also as the sensor for automatic focusing, the imaging condition of the imaging surface can be directly measured, so that the focus condition can be grasped with high accuracy.

Next, a zoom tracking method will be described. Although briefly touched on in the description of FIG. 9, when focusing is performed by a lens component situated at the rear of the variator, the path which the focusing lens should take during zooming differs according to the subject distance.

Therefore, by measuring both of the absolute positions, in the direction of the optical axis, of the variator lens and the focusing lens when zooming is started, clarifying based on this information the positional relationship which the two lenses take when zooming is performed and performing an operation such that the positions are maintained, focusing can be maintained during zooming. This operation is referred to as zoom tracking here.

As this method, Japanese Laid-Open No. H01-321416 shows a method such that focusing lens positions for a plurality of variator lens positions between the wide end and the tele end are stored for a plurality of subject distances, the locations at that time of the variator lens position and the focusing lens position on the map information stored in storage means or the like in a microcomputer are found when zooming is started, interpolation calculation is performed based on the data at the points, and the data stored closest to the side where the camera is focused on the foreground and the data stored closest to the side where the camera is focused on the background at the same focal length, and the focusing lens position at each focal length (variator position) is calculated.

FIG. 13 is a view explaining the tracking curve in the vicinity of the tele end. In this figure, the horizontal axis shows the variator lens position, and Vn shows the position of the tele end. The vertical axis shows the focusing lens position.

For example, it is assumed that P1, P4, P7 and P10 are stored for infinity and P2, P5, P8 and P11 are stored for 10 m. At this time, when zooming is performed from a condition of situating at the point P (condition where the subject distance is between 10 m and infinity at the tele end) in the direction toward the wide end, the positional relationship between the variator lens and the focusing lens is controlled so as to shift from P to PA, PB and PC in this order.

The positions of PA to PC are positions where the interpolation ratio between the stored upper and lower tracking curves LL2 and LL1 is fixed.

Next, an interchangeable lens system will be described. Conventionally, interchangeable lens systems in which shooting lenses are interchangeable for imaging apparatuses have been frequently used.

FIG. 14 shows an example of a shooting system using an interchangeable lens. As this interchangeable lens 900, like the above-described one, a four-component zoom lens system is used comprising from the subject side a positive lens component, a negative lens component, a positive lens component and a positive lens component. However, a lens system of a different structure may be used.

Reference numeral 911 shows a stationary front lens. Reference numeral 912 shows a variator lens performing zooming by moving in the direction of the optical axis. Reference numeral 936 shows a stop. Reference numeral 913 shows a stationary afocal lens. Reference numeral 914 shows a focusing lens. The focusing lens 914 functions as a compensator during zooming as well as performing focusing when the subject distance is changed.

Reference numerals 945, 952 and 937 shows the driving sources for the variator, the stop and the focusing lens, respectively. The driving sources 945, 952 and 937 are driven by a lens microcomputer 910 through driving circuits 961, 951 and 962, respectively.

On the side of a camera 1000, three image pickup devices 1003 through 1005 such as CCDs are provided. The signals output from the image pickup devices 1003 to 1005 are amplified by amplifiers 1015 through 1017, respectively. These signals are input to a signal processing circuit 1152 where an image signal of a predetermined level is produced. The produced image signal is transmitted to a camera microcomputer 1009.

The two microcomputers 910 and 1009 are coupled by a communications path connected through contacts 918 and 1007. By this, various kinds of signals are exchanged.

For example, when the focus voltage for the above-described TV signal automatic focusing is produced in the camera signal processing circuit 1152 on the side of the camera 1000, the information is transmitted from the camera microcomputer 1009 to the lens microcomputer 910.

The lens microcomputer 910 determines whether the subject is in focus or out of focus (the direction and the degree of blur) based on the signal information, decides in which direction and how fast the focusing lens 914 is driven, and drives the focusing driving source 937 through the driving circuit 962.

Next, the image pickup device will be described. As CCD image pickup devices for consumer video cameras, ones with diagonal sizes of approximately 6 mm and 4 mm called a ⅓-inch type and a ¼-inch type, respectively, are in the mainstream. In these sizes, for example, 310,000 pixels are provided.

For digital still cameras, a CCD of an approximately ½-inch type (with a diagonal size of 8 mm) having two million pixels is also used.

In the case of general small print sizes, digital cameras using a CCD with such a large number of pixels are reaching the ability to ensure image quality bearing comparison with that of photos taken by conventional film cameras when conditions are met.

In such video cameras, the permissible confusion circle diameter is approximately 12 to 15 µm, and in digital still cameras, the permissible confusion circle diameter is approximately 7 to 8 µm. These figures are far smaller than the permissible confusion circle diameters 33 to 35 µm of the conventional 135 film format.

This is because the diagonal size of the image plane is far smaller than 43 mm of the 135 film format as mentioned above. Moreover, it is conceived that these figures are smaller when the pixel size of the CCD is smaller.

From a different point of view, in imaging apparatuses using a CCD, the focal length for obtaining the same angle of view is smaller than that of 135 film cameras because the image size is smaller.

For example, the angle of view obtained at a standard focal length of 40 mm in 135 film cameras is obtained at a standard focal length of 4 mm in imaging apparatuses using a ¼-inch CCD. Therefore, the depth of field obtained when shooting is performed at the same F-number (the aperture value of the stop unit) in imaging apparatuses using the CCD is extremely large compared to that obtained in film cameras.

Since the depth of field is obtained by the permissible confusion circle diameter×the F-number (aperture value) as well known, for example, in the case of F2, the depth of field (one side) of 135 film cameras is 0.035×2=0.07 mm, whereas the depth of field of ½-inch-type imaging apparatuses is 0.007×2=0.014 mm, which is smaller than the depth of field of 135 film cameras.

As CCDs having the same diagonal size as mentioned above, for example, ⅓-inch-type CCDs of 6 mm, ones of various specifications are known such as ones intended for increasing resolution by increasing the number of pixels from one million to two million and further to three million in the future, and ones regarding dynamic range and sensitivity important without excessively reducing the pixel size.

Next, a light quantity adjusting method will be described. In imaging apparatuses using an image pickup device such as a CCD as the image sensor like video cameras and digital still cameras, it is common practice to automatically obtain optimum exposure by controlling the aperture diameter with the stop so that the level of the luminance signal of the CCD is in a predetermined range.

As the stop, one using two stop blades and having a rhombic aperture and an iris stop using five or six stop blades are known.

When the aperture diameter of the stop is reduced, a problem arises in that image quality is degraded by diffraction. Therefore, in these imaging apparatuses, the control range of the aperture diameter of the stop is generally limited to a range where no image degradation occurs or image degradation is not a significant problem even if it occurs.

This is performed by the microcomputer grasping the current aperture value and not using the F-numbers on the small aperture side of a predetermined F-number.

However, when the usable aperture range is limited like this, it is difficult to adjust the light quantity so as to be optimum only by the stop for a wide range of brightness of the actual field.

Therefore, the brightness range adjustable by the same aperture control (for example, minimum to F8) is increased by integrally attaching an ND filter to the stop blade so that the ND filter covers the aperture when the aperture diameter decreases. There are cases where a method changing the charge accumulation time of the CCD (shutter speed) is combined.

Examples of ND filters include not only the above-described one integrally attached to the stop blade and driven but also one having a driving source provided specifically therefor and whose amount of insertion into the optical path is controlled separately from the stop.

Next, the shooting lens will be described. The shooting lens is designed and manufactured so that necessary resolution performance, or MTF (modulation transfer function) performance, determined by the pixel pitch of the CCD used is obtained.

Moreover, the shooting lens has an effective image circle determined by the size of the CCD.

In the imaging apparatus structured as described above, many functions are based on the CCD specifications and designed so as to be optimized for the CCD specifications.

First, with respect to AF, since the focal point is determined based on the peak of the high-frequency component of the image signal obtained from the CCD, the movement amount of one step when the focusing lens is driven by a stepping motor is set based on the permissible confusion circle determined by the pixel pitch of the CCD and the minimum F-number of the stop.

When the direction of the best focus is searched for by so-called wobbling (minute reciprocating driving in the direction of the optical axis) of the lens, the wobbling amount corresponding to the F-number is also determined by the permissible confusion circle specification (and by extension, to the CCD specification), and the level when it is determined whether the subject is in focus or out of focus is also determined in association with the CCD.

With respect to automatic exposure control AE, the F-number at which image degradation due to small aperture diffraction occurs is determined by the pixel pitch of the CCD. Exposure is controlled so that the F-numbers on the small aperture side of this F-number are not used.

With respect to the effective image circle, in designing and manufacturing the lens, the lens is designed in accordance with the size of the CCD so that no eclipse occurs.

With respect to the resolution performance, the design value is determined by the pixel pitch specifications of the CCD and the like in designing and manufacturing the lens.

As described above, lens interchangeable imaging apparatuses are designed so that excellent imaging performance is obtained for all the interchangeable lenses according to the specifications of the CCD used by the imaging apparatus.

However, the CCD corresponds to the film in film cameras, and characteristics (for example, the number of pixels, the sensitivity and the dynamic range) differ according to the specifications even though the image size is the same, such that high image quality is required although the sensitivity is low as mentioned above or that high sensitivity is required, in accordance with the object of the shooting.

Moreover, CCDs are decreasing in pixel size year after year as semiconductor manufacturing technology improves, and specifications are changing year after year to extend the range of choices.

Even if an interchangeable lens shooting system is designed with one kind of CCD in mind under such circumstances, the entire system will soon be rendered obsolete as the CCD improves, or every time a new CCD is created, it is necessary to re-design the lens in accordance with the latest CCD.

Moreover, when a lens always satisfying the highest performance of the CCD is prepared, since it is necessary that sufficient MTF be obtained even when the system is designed with a CCD having the highest pixel size in mind, even users not requiring such high image quality are obliged to use a lens of unnecessarily high performance (in many cases, the lens size increases as the MTF increases).

SUMMARY OF THE INVENTION

Accordingly, an object of the present invention is to enable appropriate images to be efficiently recorded on the side of the imaging apparatus according to various performances of the imaging lens apparatus.

To achieve the above-mentioned object, according to the present invention, a lens apparatus interchangeably attached to an imaging apparatus having an image pickup device comprises: an imaging optical unit having a movable optical component for changing a focal length; a memory in which information of an optical performance of the imaging optical unit corresponding to the focal length of the imaging optical unit is stored; and a controller. The controller takes out the information of the optical performance corresponding to the focal length from the memory in response to an instruction from the imaging apparatus, and transmits the information to the imaging apparatus.

Moreover, according to the present invention, a lens apparatus interchangeably attached to an imaging apparatus having an image pickup device comprises: an imaging optical unit; a light quantity adjusting unit disposed on an optical path of the imaging optical unit, and changing a light quantity by changing an aperture diameter; a memory in which information of an optical performance of the imaging optical unit corresponding to the aperture diameter of the light quantity adjusting unit is stored; and a controller. The controller takes out the information of the optical performance corresponding to the aperture diameter from the memory in response to an instruction from the imaging apparatus, and transmits the information to the imaging apparatus.

Further, according to the present invention, an imaging apparatus to which a lens apparatus having a memory in which information of an optical performance is stored is interchangeably attached comprises: an image pickup device imaging a subject image from the lens apparatus; and a controller changing an information size of image information from the image pickup device. The controller changes the information size of the image information in accordance with the information of the optical performance of the lens apparatus.

Moreover, according to the present invention, an optical apparatus comprises an imaging apparatus and a lens apparatus interchangeably attached to the imaging apparatus. The imaging apparatus and the lens apparatus each have a communicating portion performing communications between the imaging apparatus and the lens apparatus. The optical apparatus comprises: an imaging optical unit; a memory in which information of an optical performance of the imaging optical unit is stored; an image pickup device imaging a subject image from the imaging optical unit; an imaging controller changing an information size of image information from the image pickup device; and a lens controller connected to the imaging controller through the communicating portions and performing communications with the imaging controller. The lens controller takes out the information of the optical performance from the memory in response to an instruction from the imaging controller, and transmits the information to the imaging controller through the communicating portions. The imaging controller changes the information size of the image information in accordance with the information of the optical performance from the lens controller.

Further, according to the present invention, an optical apparatus comprises an imaging apparatus and a lens apparatus interchangeably attached to the imaging apparatus. The imaging apparatus and the lens apparatus each have a communicating portion performing communications between the imaging apparatus and the lens apparatus. The optical apparatus comprises: an imaging optical unit; a light quantity adjusting unit disposed on an optical path of the imaging optical unit, and changing a light quantity by changing the aperture diameter; a lens controller changing an aperture diameter of the light quantity adjusting unit; a memory in which information of an optical performance of the imaging optical unit is stored; an image pickup device imaging a subject image from the imaging optical unit; and an imaging controller connected to the lens controller through the communicating portions and performing communications with the lens controller. The lens controller takes out the information of the optical performance from the memory in response to an instruction from the imaging controller, and transmits the information to the imaging controller through the communicating portions. The imaging controller sets an operation range of the aperture diameter of the light quantity adjusting unit in accordance with the information of the optical performance from the lens controller, and transmits information of the set operation range to the lens controller through the communicating portions. The lens controller changes the aperture diameter of the light quantity adjusting unit based on information of the set operation range from the imaging controller.

Moreover, according to the present invention, an optical apparatus comprises an imaging apparatus and a lens apparatus interchangeably attached to the imaging apparatus. The imaging apparatus and the lens apparatus each have a communicating portion performing communications between the imaging apparatus and the lens apparatus. The optical apparatus comprises: an imaging optical unit; a memory in which information of an optical performance of the imaging optical unit is stored; an image pickup device imaging a subject image from the imaging optical unit; a selecting portion for selecting an information size of image information from the image pickup device, having an operation member, and selecting the information size corresponding to an operation of the operation member; a display displaying information showing the image information and the information size; an imaging controller changing the information size of the image information from the image pickup device; and a lens controller connected to the imaging controller through the communicating portions and performing communications with the imaging controller. The lens controller takes out the information of the optical performance from the memory in response to an instruction from the imaging controller, and transmits the information to the imaging controller through the communicating portions. The imaging controller compares the information size of the image information selected by the selecting portion with an information size of the image information corresponding to the information of the optical performance from the lens controller, and when the selected information size is larger than the information size corresponding to the information of the optical performance, provides a display showing a warning on the display.

Further, according to the present invention, an optical apparatus comprises an imaging apparatus and a lens apparatus interchangeably attached to the imaging apparatus. The imaging apparatus and the lens apparatus each have a communicating portion performing communications between the imaging apparatus and the lens apparatus. The optical apparatus comprises: an imaging optical unit; a memory in which information of an optical performance of the imaging optical unit is stored; an image pickup device imaging a subject image from the imaging optical unit; a selecting portion for selecting an information size of image information from the image pickup device, having an operation member, and selecting the information size corresponding to an operation of the operation member; a display displaying information representative of the image information and the information size; an imaging controller changing the information size of the image information from the image pickup device; and a lens controller connected to the imaging controller through the communicating portions and performing communications with the imaging controller. The lens controller takes out the information of the optical performance from the memory in response to an instruction from the imaging controller, and transmits the information to the imaging controller through the communicating portions. The imaging controller compares the information size of the image information selected by the selecting portion with an information size of the image information corresponding to the information of the optical performance from the lens controller, and when the selected information size is smaller than the information size corresponding to the information of the optical performance, changes the information size of the image information based on the selected information size.

Moreover, according to the present invention, an optical apparatus comprises an imaging apparatus and a lens apparatus interchangeably attached to the imaging apparatus. The imaging apparatus and the lens apparatus each have a communicating portion performing communications between the imaging apparatus and the lens apparatus. The optical apparatus comprises: an imaging optical unit; a memory in which information of an optical performance of the imaging optical unit is stored; an image pickup device imaging a subject image from the imaging optical unit; a recording portion on which image information from the image pickup device is recorded; an imaging controller changing an information size of the image information recorded on the recording portion; a display displaying information showing the image information and the information size; and a lens controller connected to the imaging controller through the communicating portions and performing communications with the imaging controller. The lens controller takes out the information of the optical performance from the memory in response to an instruction from the imaging controller, and transmits the information to the imaging controller through the communicating portions. The imaging controller changes the information size of the image information recorded on the recording portion in accordance with the information of the optical performance from the lens controller. The imaging controller displays on the display the image information of the changed information size and information showing the information size.

Moreover, according to the present invention, an optical apparatus comprises an imaging apparatus and a lens apparatus interchangeably attached to the imaging apparatus. The imaging apparatus and the lens apparatus each have a communicating portion performing communications between the imaging apparatus and the lens apparatus. The optical apparatus comprises: an imaging optical unit; a memory in which information of an optical performance of the imaging optical unit is stored; an image pickup device imaging a subject image from the imaging optical unit; a vibration detector detecting a vibration of the optical apparatus; an imaging controller performing image vibration compensation by shifting a reading position of image information from the image pickup device in accordance with an output from the vibration detector; and a lens controller connected to the imaging controller through the communicating portions and performing communications with the imaging controller. The lens controller takes out the information of the optical performance from the memory in response to an instruction from the imaging controller, and transmits the information to the imaging controller through the communicating portions. The imaging controller changes an amount of a permissible range in which the reading position of the image information is shiftable, in accordance with the information of the optical performance from the lens controller.

Moreover, according to the present invention, the information of the optical performance is information of an optical resolution performance of the imaging optical unit or information of an effective image circle of the imaging optical unit.

Further, according to the present invention, the changing of the information size of the image information by the controller is performed by changing an image plane size or changing a compression rate of the image information.

Other objects and features of the present invention will become clear from the following description of embodiments.

DETAILED DESCRIPTION OF THE PREFERRED EMBODIMENT

Figure 1:
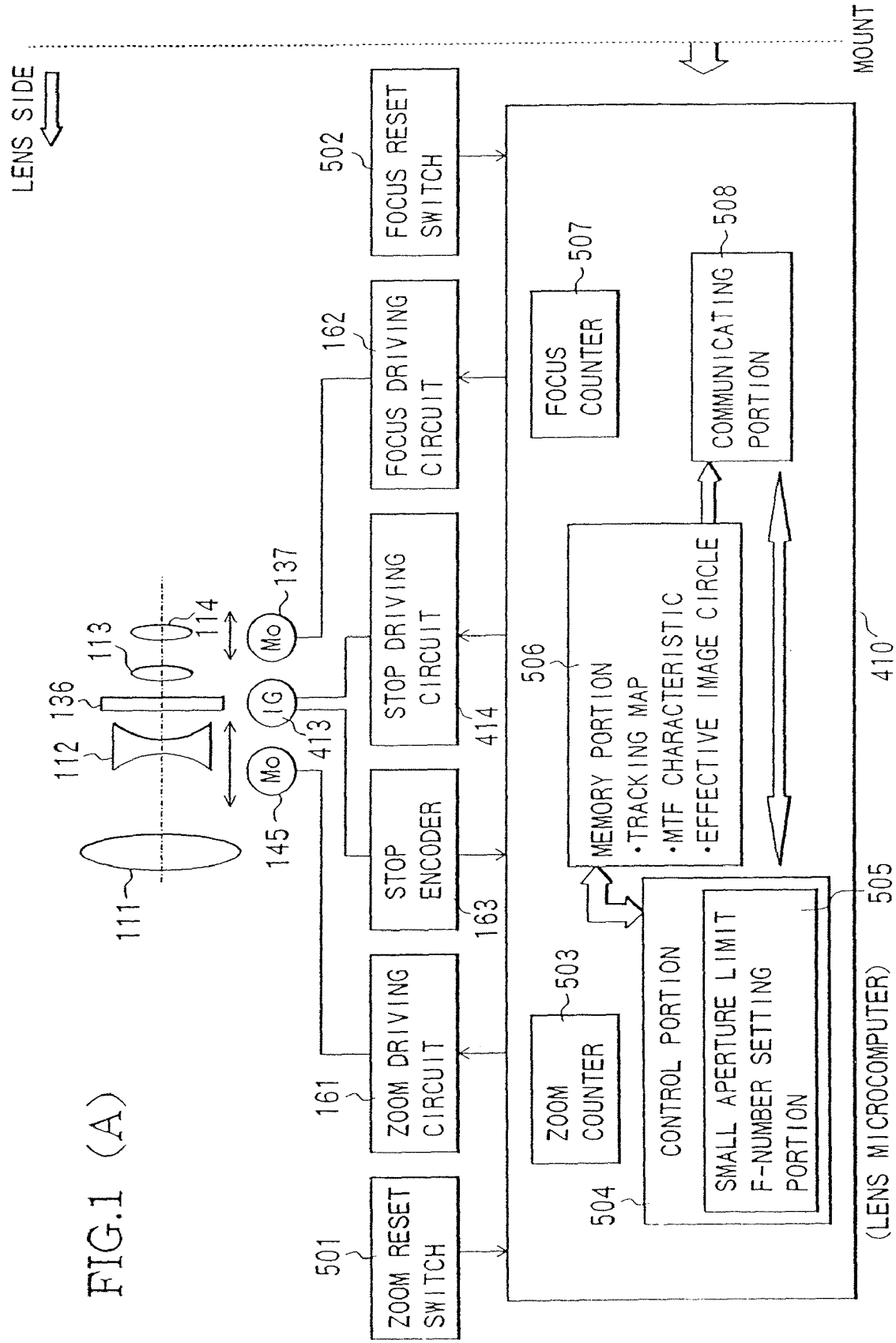
FIGS. 1(A) and 1(B) are block diagrams showing the structure of an imaging system according to a first embodiment of the present invention.
Figure 1:
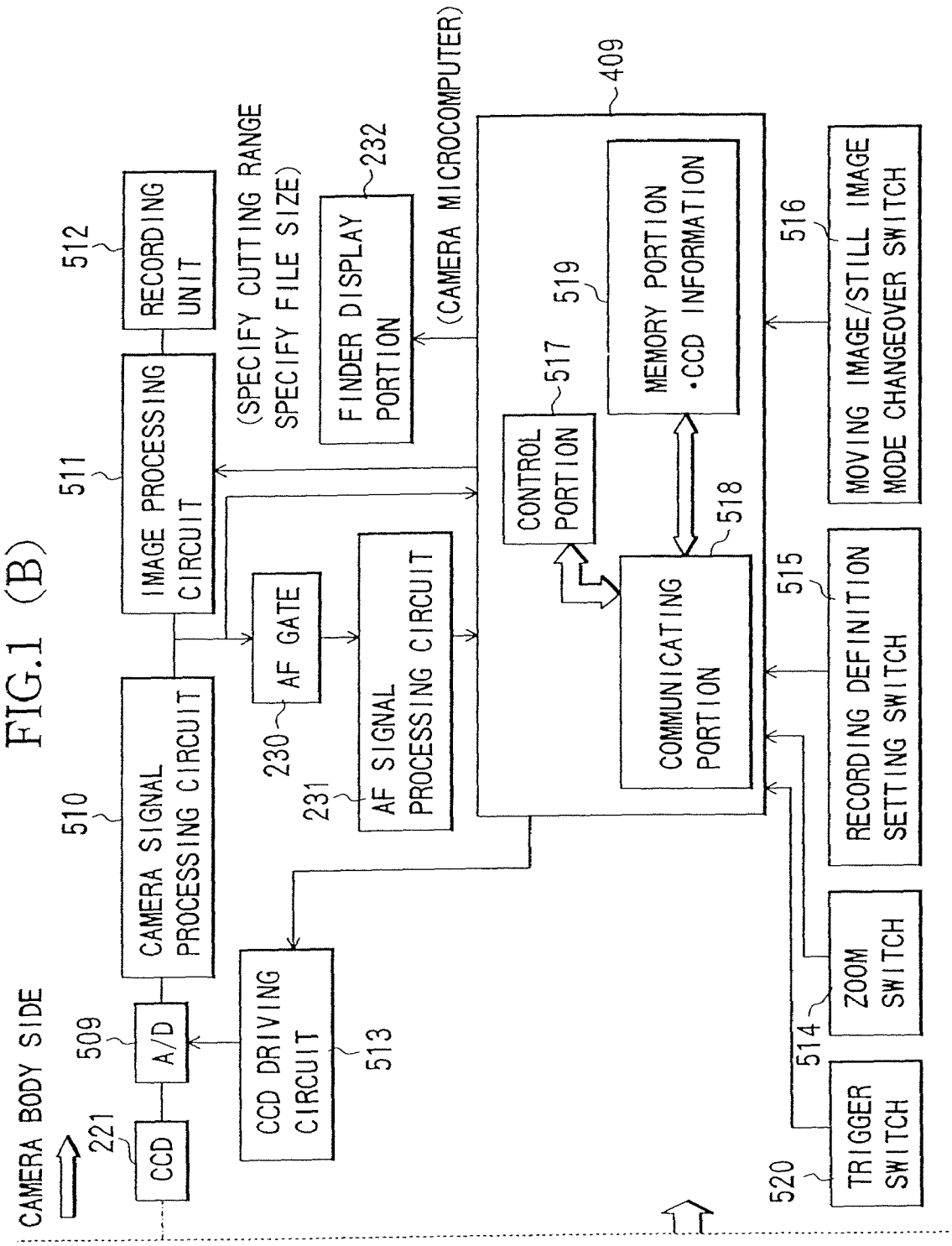

FIGS. 1(A) and 1(B) show the structure of a principal part of an imaging system according to a first embodiment of the present invention. This imaging system comprises a camera body (imaging apparatus) and a shooting lens interchangeable for the camera body.

First, the structure on the shooting lens side will be described. In FIG. 1(A), reference numerals 111 through 114 shows four lens components included in the shooting lens. The shooting lens of the present embodiment is a zoom lens system having four lens components: from the subject side, a positive lens component, a negative lens component, a positive lens component and a positive lens component. However, the shooting lens apparatus of the present invention is not limited to the shooting lens of this lens component structure.

The lens component 111 is a stationary front lens component. The lens component 112 is a variator lens component changing the focal length (performing zooming) by changing its position in the direction of the optical axis. The lens component 113 is a stationary afocal lens component. The lens component 114 is a focus compensating lens having both a function as a compensator maintaining constant the subject distance where the subject is in focus during zooming and a function as a focusing lens.

Reference numeral 136 shows a diaphragm unit (light quantity adjusting unit) inserted in the optical path of the shooting lens. The stop unit 136 adjusts the quantity of passing light by changing the aperture area (aperture diameter) of the stop by operating an IG meter 413 as a driving source.

Reference numeral 145 shows a zoom motor for driving the variator lens component 112. In the present embodiment, a stepping motor is used. The zoom motor 145 rotates by predetermined angles in accordance with a predetermined step pulse applied by a zoom driving circuit 161.

Figure 8:
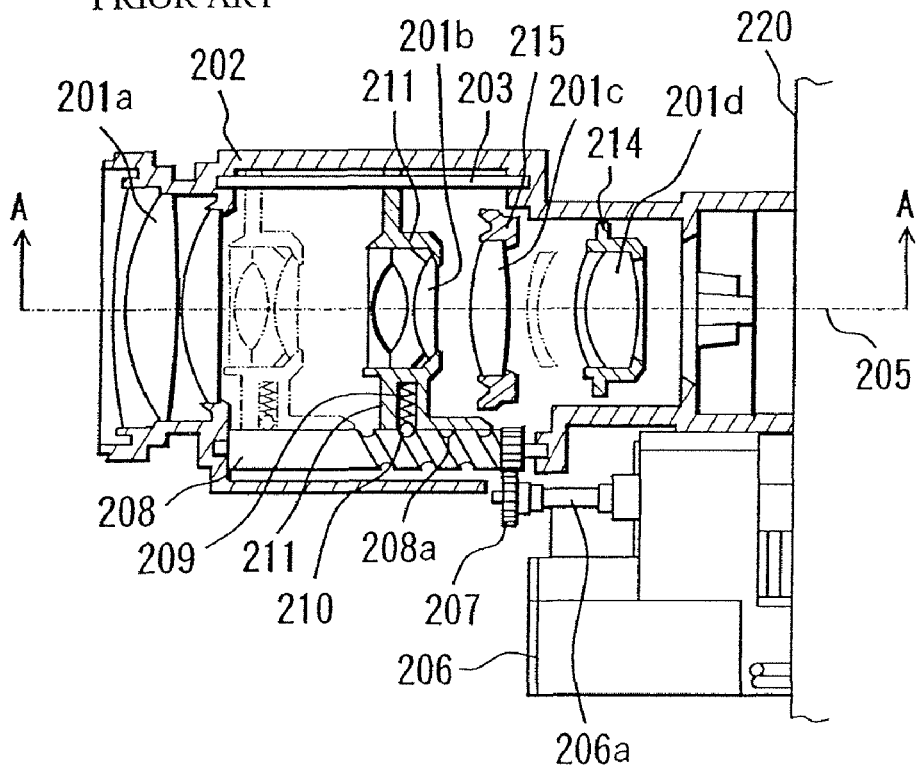
FIGS. 8(A) and 8(B) are cross-sectional views of the shooting lens used for the conventional video camera.
Figure 8:
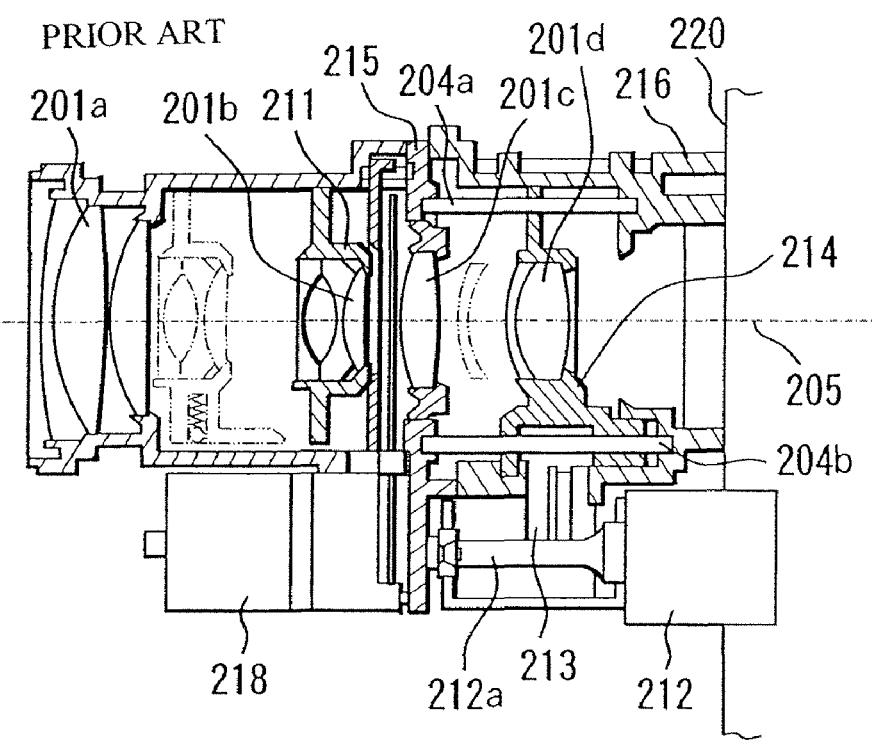
Figure 9:
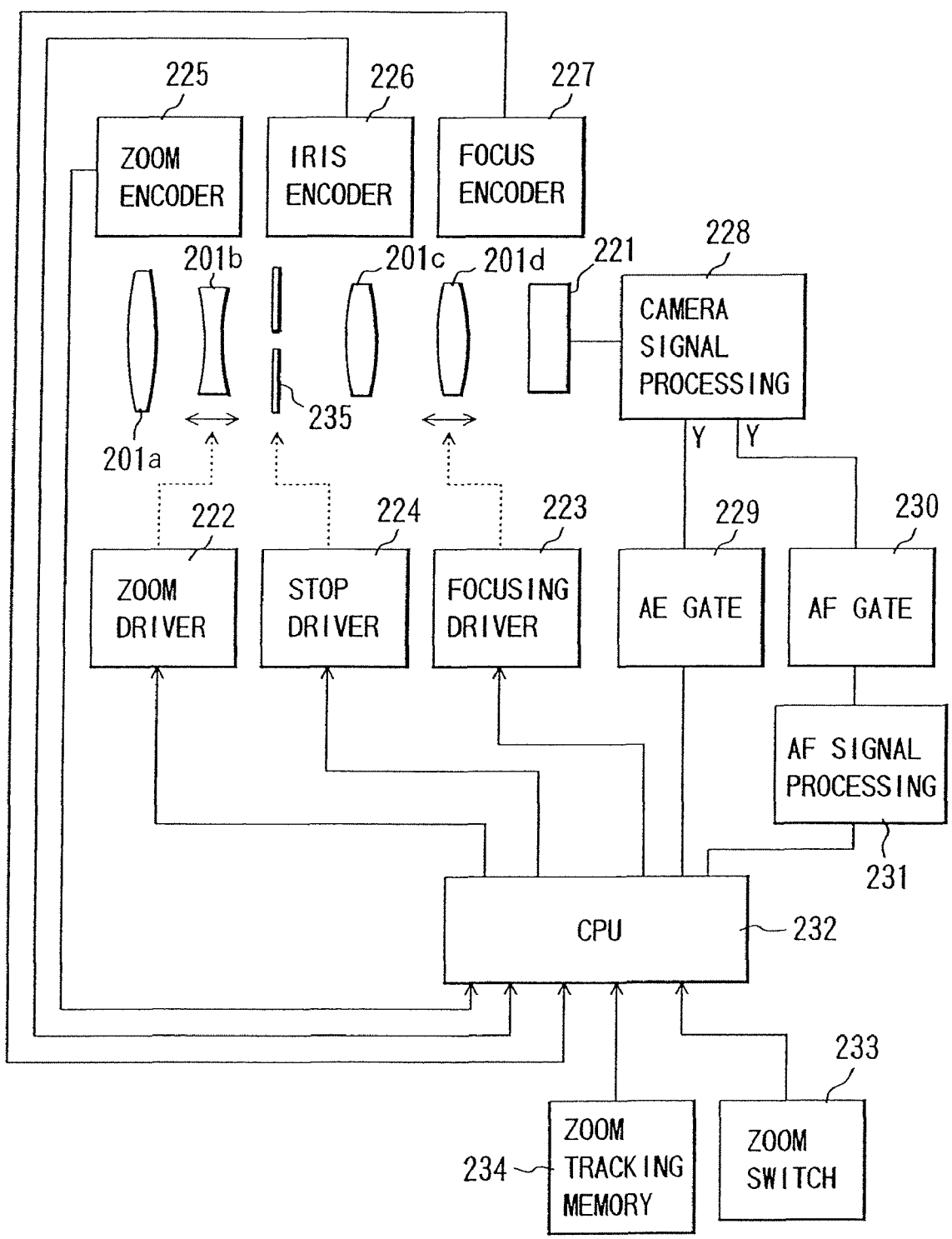
FIG. 9 is a block diagram showing the structure of the conventional imaging system.
Figure 10:
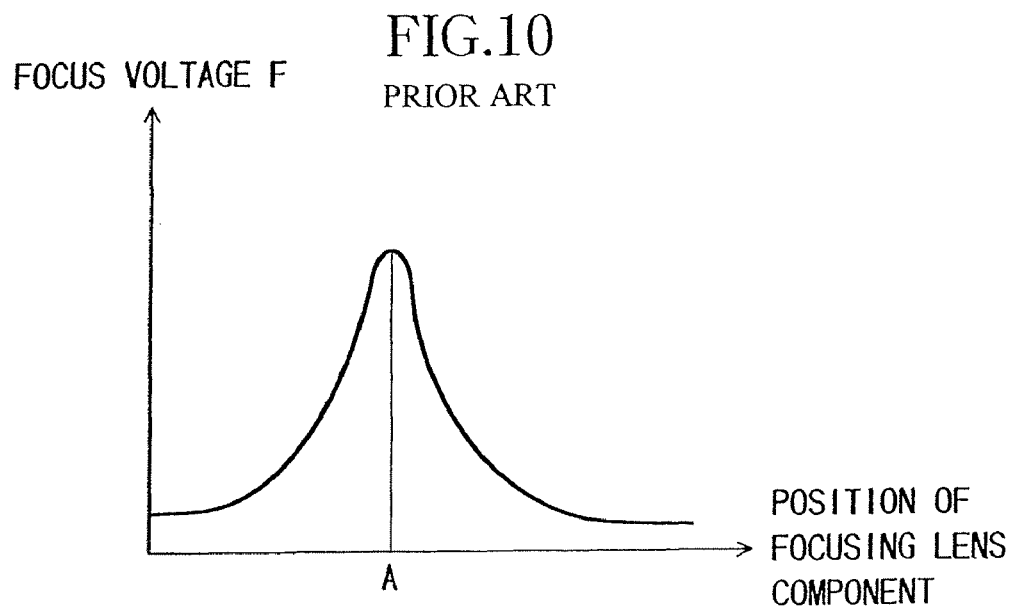
FIG. 10 is a view explaining the principle of the conventional automatic focusing using a TV signal.
Figure 11:
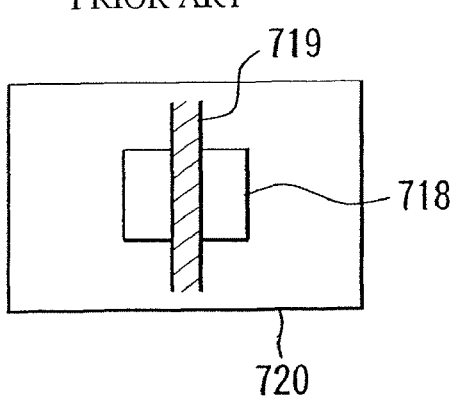
FIGS. 11(A) and 11(B) are views explaining the conventional automatic focusing using a TV signal.
Figure 11:
Figure 11:
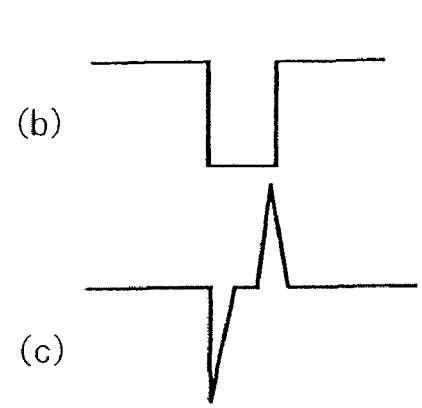
Figure 11:
Figure 11:
Figure 12:
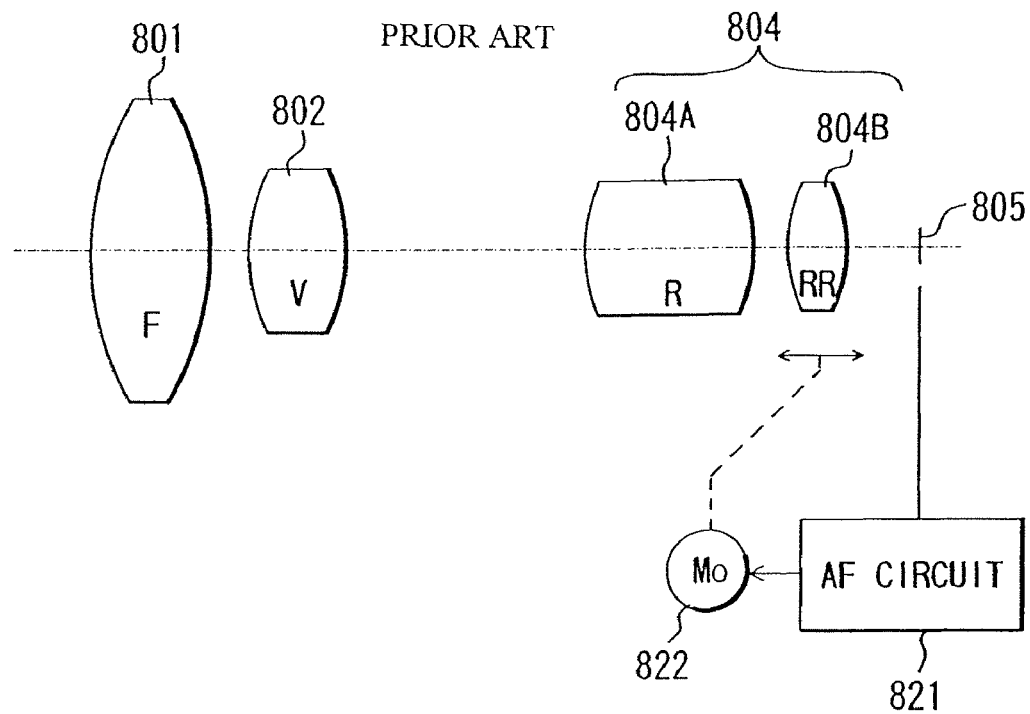
FIG. 12 is a view explaining the principle of the conventional automatic focusing using a TV signal.
Figure 13:
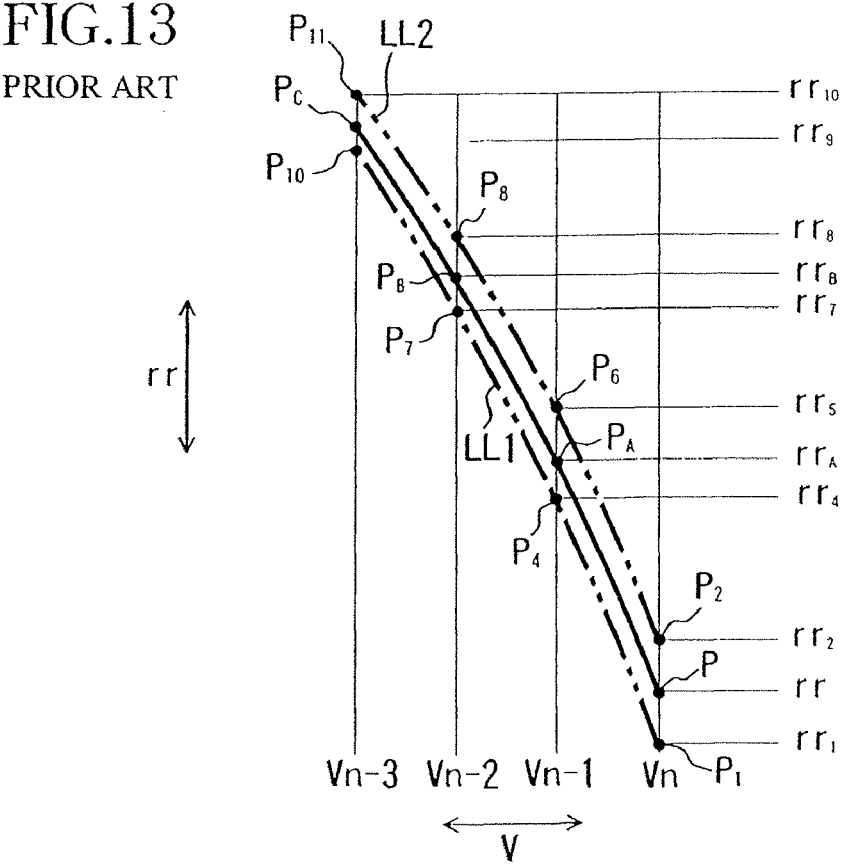
FIG. 13 is a view explaining an example of map data of the conventional zoom tracking.
Figure 14:
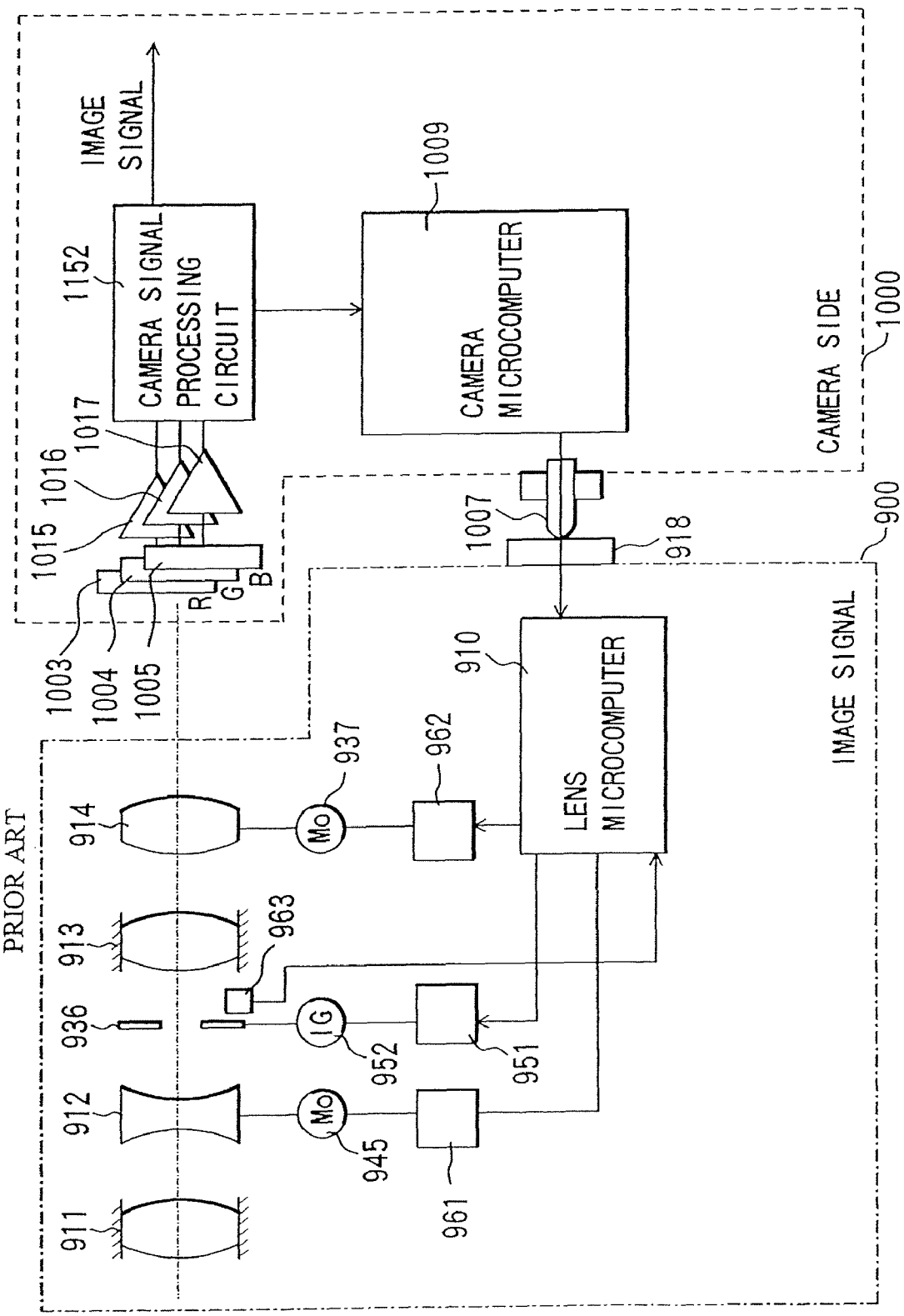
FIG. 14 is a block diagram showing the structure of the conventional interchangeable lens imaging system.

With respect to the mechanism converting the rotation of the zoom motor 145 to the movement of the variator lens component 112, the structure described with reference to FIGS. 8(A) and 8(B) or the like is used.

The absolute position of the lens component 112 in the direction of the optical axis can be encoded by continuously counting the number of steps input to the motor for driving the zoom motor 145. To do this, it is necessary that the lens component 112 be always situated at a predetermined position in starting the counting. In the present embodiment, a zoom reset switch 501 for detecting that the lens component 112 is situated at a predetermined initial position is provided.

That is, by counting, by a zoom counter 503 provided in a lens microcomputer 410, the pulses continuously input to the zoom motor 145 from the initial position where the zoom reset switch 501 is turned on, a variator encoder is structured.

The focus compensating lens component 114 is driven by a focus motor 137 comprising a stepping motor in the present embodiment, and has a focus driving circuit 162, a focus reset switch 502 and a focus counter 507 similar to those provided for the variator lens component 112.

In addition to these, the lens microcomputer 410 has a memory portion 506, a control portion 504 and a communicating portion 508.

In the memory portion 506, MTF characteristic data and effective image circle data which are information showing the optical resolution performance of the present shooting lens are stored as well as the map data for performing zoom tracking. The control portion 504 has a setting portion 505 setting a small aperture limit F-number.

Next, the structure of the camera body side will be described. In FIG. 1(B), reference numeral 221 shows an image sensor comprising a CCD (image pickup device; hereinafter, referred to as CCD). The image pickup device in the present invention is not limited to a CCD.

The CCD 221 is driven by a CCD driving circuit 513. The image signal by the accumulation of charge in each pixel for which the signal is obtained from the CCD 221 is converted to a digital signal by an A/D converting portion 509, and then, predetermined signal processings such as amplification and gamma correction are performed thereon by a camera signal processing circuit 510. Only a predetermined central part of the image signal having undergone the signal processings is extracted by the AF gate 230. The extracted part is processed into information of the high-frequency component of the Y signal by the AF signal processing circuit 231, and is then transmitted to the camera microcomputer 409.

The signal processed into information of the high-frequency component of the Y signal passes through a non-illustrated block, processed into a signal for performing exposure determination as to whether the image signal is at a predetermined level or not, and then, taken into the camera microcomputer 409.

The values associated with the high-frequency components of the image signals and the signals associated with the levels of the image signals are communicated between the lens microcomputer 410 and the camera microcomputer 409 through a mount. Receiving these signals, the lens microcomputer 410 drives the stop unit 136 and the focusing lens component 114 to obtain in-focus condition or optimum exposure condition.

Reference numeral 511 shows an image processing circuit performing electronic zoom processing on the image signals produced by the camera signal processing circuit 510 to thereby change the image cutting size, and changing an image cutting position for a non-illustrated electronic camera vibrating compensation. In addition thereto, the image processing circuit 511 converts the image resolution to thereby change the file size (data size) for image recording, and performs compression processing to thereby convert the image data size. There are cases where the image processing circuit 511 performs processing to correct distortion of the lens.

Reference numeral 512 shows a recording unit recording the output of the image processing circuit 511 onto a recording medium. Examples of recording media used for the recording unit 512 include cards, disks and tapes.

The camera microcomputer 409 has a control portion 517, a communicating portion 518 and a memory portion 519 like the lens microcomputer 410. In the memory portion 519, information of the size (effective diagonal length), the number of pixels and the pixel pitch of the CCD of the camera is stored.

The conditions of the switches to be operated by the user for which switches are provided on the camera body side are all input to the camera microcomputer 409. In the present embodiment, the conditions of a trigger switch 520, a zoom switch 514, a recording definition setting switch 515 and a moving image/still image mode changeover switch 516 are input.

In the imaging system structured as described above in which the shooting lens is interchangeable for the camera body, when communications is performed between the lens microcomputer 410 and the camera microcomputer 409 through the communications contacts provided on the mount, information associated with the MTF characteristic (hereinafter, referred to MTF associated information) of the lens side is transmitted to the camera body side.

The within-named MTF associated information may be raw MTF characteristic data or may be information replaced with several levels based on the MTF characteristic data value. Further, some conversion result with which the signal processings to be performed thereafter are easy to perform may be transmitted. That is, information of any configuration may be used as long as it is associated with MTF.

The image definition has various levels such as VGA (video graphics array), XGA (extended graphics array) and SXGA (super extended graphics array). To which level of definition the image data file for which sufficient resolution can be satisfied corresponds differs according to the degree of MTF of the shooting lens.

For example, there can be cases where there is a clear difference between when VGA recording is performed and when XGA recording is performed (the lens performance is not less than XGA) and where only a definition equal to that obtained when VGA recording is performed can be obtained both when VGA recording is performed and when XGA recording is performed (the lens performance is designed only for the VGA class) according to whether the shooting lens can sufficiently resolve a definition of 50 lines per millimeter on the image surface (for example, MTF is not less than 50%) or not.

On the other hand, the higher the definition is, the lower the efficiency is. This is because the higher the definition is, the larger the file size of the recorded image information is and the more the capacity of the recording medium set in the camera body is consumed.

Therefore, in the present embodiment, by setting an optimum recording file size by the camera microcomputer 409 based on the MTF associated information transmitted from the lens microcomputer 410, necessary and sufficient recording is performed in accordance with the performance of the shooting lens.

The camera microcomputer 409 specifies a file size optimum for the image definition shown by the MTF associated information from the shooting lens, and produces image data of a necessary and sufficient (minimum) file size by the image processing circuit 511.

Further, in the present embodiment, the camera microcomputer 409 sets the use limit F-number (maximum F-number) at which small aperture diffraction occurs in the shooting lens, based on the MTF associated information from the shooting lens, and transmits this information to the shooting lens.

Specifically, the F-number at which small aperture diffraction occurs is calculated from the MTF associated information transmitted from the lens microcomputer 410 and the information of the pixel pitch of the CCD set in the camera microcomputer 409, and the calculated F-number or an F-number slightly smaller than the calculated F-number is set as the use limit F-number.

For example, in a case where although the shooting lens is designed for a three-million-pixel CCD of a specific size and the limit F-number of the three-million-pixel CCD is F5.6, F-numbers up to F8 can be used when the camera body side has a two-million-pixel CCD of the same size, the setting, in the setting portion 505, of the small aperture limit F-number of the shooting lens side is changed from the reference F5.6 to F8. This enables a wider range of exposure adjustment.

Moreover, in the present embodiment, the camera microcomputer 409 notifies the user of the information of the file size or the image definition set on the camera body side by displaying it on a finder display portion 232 comprising an electronic finder (a LCD finder or an electronic view finder).

In the camera body of the present embodiment, the user can arbitrarily set the image definition used through the recording definition setting switch 515. In this case, when the user sets an image definition corresponding to (excessively) high quality recording unsuitable for the performance of the shooting lens, a warning display is provided on the finder display portion 232. This warning operation is determined and performed according to the flowchart of FIG. 2 described later.

In the memory portion 506 of the shooting lens of the present embodiment, a plurality of pieces of MTF characteristic data for at least one of each focal length and each F-number is stored. With this, a more optimum file size and use limit F-number can be set on the camera body side than when typical MTF characteristic data (one piece of data) not depending on the focal length or the F-number is used, so that more efficient image recording can be performed.

This is for the following reason: The MTF characteristic data normally varies among the focal lengths and the F-numbers, and there are cases where although the MTF condition is such that the performance of the CCD cannot be sufficiently delivered under a certain condition, satisfaction is obtained under a different condition. Therefore, by providing MTF characteristic data of each focal length and each F-number in the lens microcomputer 410 (memory portion 506) and transmitting to the camera microcomputer 409 the information associated with the MTF characteristic data according to the conditions of the focal length and the F-number at that time, an image of the best quality can be efficiently recorded in a necessary and sufficient range on the camera body side.

Figure 2:
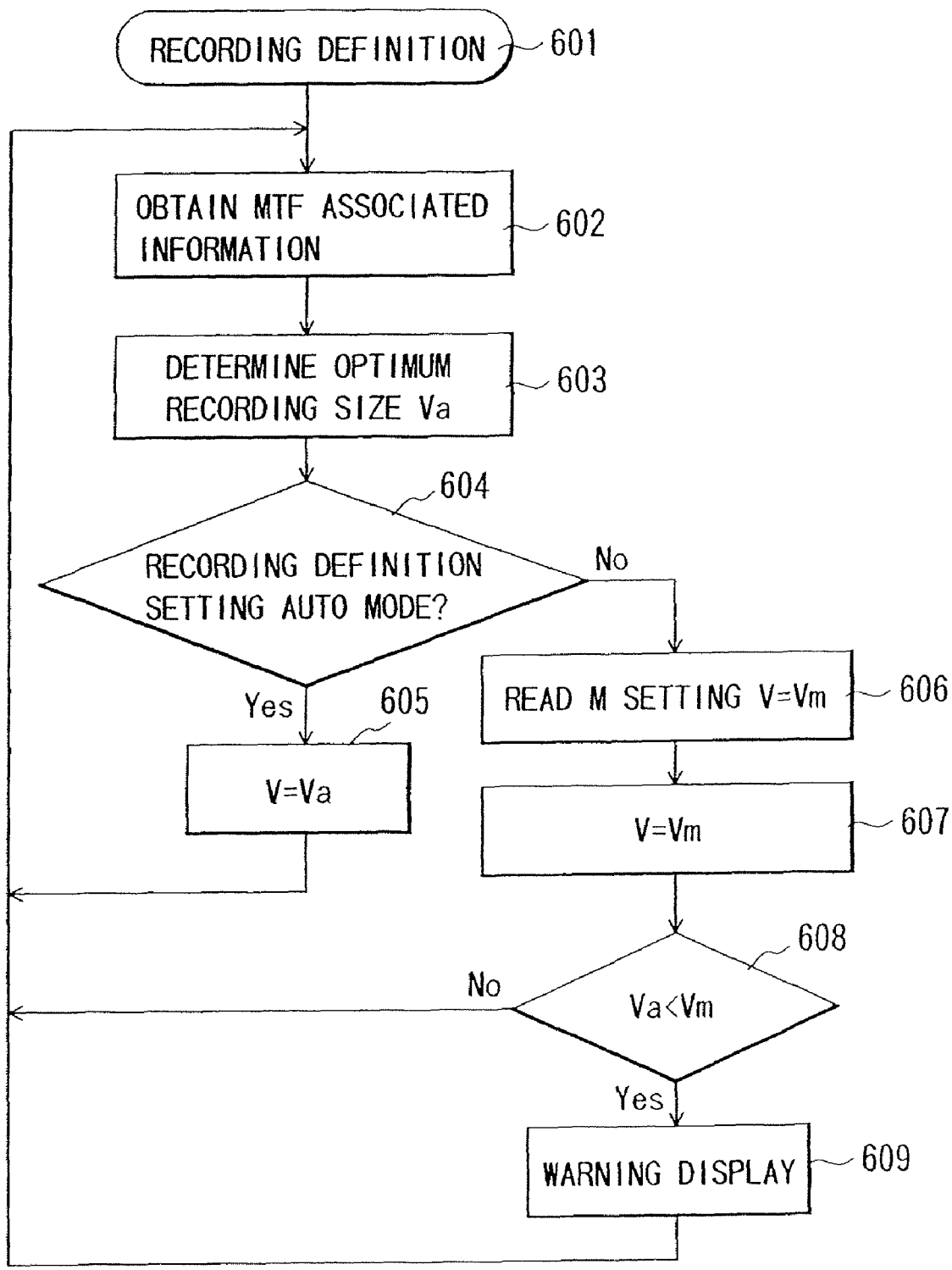
FIG. 2 is a flowchart of the operation of a camera body included in the imaging system of the first embodiment.

Next, the operation of the camera microcomputer 409 will be described with reference to the flowchart of FIG. 2. First, when the operation is started at step 601, at step 602, a request for transmission of the MTF associated information is transmitted to the lens microcomputer 410, and the MTF associated information transmitted from the lens microcomputer 410 in response to the request is obtained.

The MTF associated information transmitted at this time is based on the MTF characteristic data corresponding to the focal length and the F-number, at that time, of the shooting lens.

At step 603, an optimum recording file size Va is determined as described above based on the obtained MTF associated information of the lens side.

At step 604, whether the recording definition setting of the camera body side is an auto mode or not is determined. When the setting is the auto mode, the recording file size Va determined at step 603 is used, and an optimum setting is made that can deliver the performance of the shooting lens to the maximum and does not use an unnecessarily large file size. In this case, the file size used V is set to Va at step 605.

When the file size used V is set, the image is recorded with the definition of the file size V when the user triggers recording by operating the trigger switch 520.

When it is determined at step 604 that the recording definition setting is not the auto mode (is a manual mode), at step 606, an image definition Vm set by the user is read in. In the case of the manual mode, since the value set by the user is given a higher priority, at step 607, the file size used V is set to Vm.

Then, at step 608, the file size Va set by the camera microcomputer 410 based on the MTF associated information is compared with the file size Vm set by the user. When Va is larger, since the file size set by the user corresponds to a definition sufficient for the lens performance, the process directly returns to 602.

In the case where it is determined that the file size Vm set by the user is such that with the lens performance, even if such a high definition is set, the image quality is no different from that obtained when the image is recorded with a lower definition, that is, in the case where Va<Vm, at step 609, a warning display regarding that is provided on the finder display portion 232.

By viewing this warning display, the user notices that the setting is unnecessarily wasting the capacity of the recording medium, and can make the setting close to an optimum setting, for example, by reducing the manually set recording definition.

While the definition of the recorded image can be manually set by the user in the present embodiment, the file size may be manually set.

While in the present embodiment, a case where the file size Va set by the camera microcomputer 409 based on the MTF associated information is compared with the file size Vm set by the user is described with reference to the flowchart of FIG. 2, the image definition corresponding to the file size Va may be compared with the image definition set by the user.

Second Embodiment

While in the first embodiment, the MTF associated information based on the MTF characteristic data of the shooting lens side is transmitted to the camera body side and based on this information, the image can be recorded in a minimum file size in a range where the lens performance can be delivered to the maximum on the camera body side, in the present embodiment, information associated with the effective image circle of the shooting lens (hereinafter, referred to as effective image circle associated information) is transmitted from the lens side to the camera body side.

In the present embodiment, the effective image circle data of the shooting lens is stored in the memory portion 506 of the lens microcomputer 410 shown in FIG. 1(A). This data is stored as values of a plurality of effective image circles corresponding to the focal lengths and the F-numbers of the shooting lens.

The lens microcomputer 410 transmits information associated with the effective image circle to the camera microcomputer 409 through the mount. The transmitted effective image circle associated information may be raw effective image circle data or may be information obtained by converting the raw data as required.

For example, when the effective diagonal length of the CCD 221 of the camera body is 6 mm, by attaching the shooting lens with an effective image circle of 6 mm or more, an image without any waste or eclipse can be shot even when the entire image plane obtained from the CCD is recorded.

However, when a shooting lens with an effective image circle of 4 mm is attached, the corners of the image are eclipsed (the corners become dark and no image is present therein). Therefore, in such a case, the camera microcomputer 409 determines the range where an image without any eclipse can be cut (image acquisition range on the CCD 221) based on the effective image circle associated information of the shooting lens transmitted from the lens microcomputer 410, and the image processing circuit 511 sets the cutting range, whereby image recording without any waste can be performed.

In the present embodiment, the image shot in the cutting range set by the image processing circuit 511 is displayed on the finder display portion 232 so that the angle of view substantially the same as the recorded angle of view is shown and the user is notified of information of the angle of view.

For example, even when a shooting lens designed so that the effective image circle diameter is 4 mm is attached to the camera body having a CCD with a diagonal length of 6 mm, only a range of a diagonal length of 4 mm on the CCD is cut. Therefore, even when the focal length is the same (for example, f=5 mm), there is a difference in angle of view between when image cutting is unnecessary because a shooting lens with an effective image circle diameter of 6 mm is used and when image cutting is necessary because the shooting lens has an effective image circle diameter of only 4 mm.

For example, converting the angle of view to the focal length of a 135-film-format shooting lens, even at the same focal length of f=5 mm, the focal length is approximately 43 mm when the effective image circle diameter is 6 mm, and the focal length is approximately 55 mm when the image is cut with an effective image circle diameter of 4 mm.

In the present embodiment, as described above, the user's confusion is avoided by calculating and displaying an angle of view with which an image without any eclipse can be shot even when lenses of various effective image circle diameters are attached, by showing the angle of view converted to the focal length of the 135 film format with which many users are familiar.

To do this, in the camera microcomputer 409, a simple calculation is performed based on the effective image circle diameter A shown by the effective image circle associated information transmitted from the shooting lens, information f of the focal length of the shooting lens also transmitted from the lens side and information C of the diagonal length of the CCD 221 of the camera body.

That is, the angle of view at that time is converted to the focal length of the 135 film format by f×43/A when A<C and by f×43/C when C<A. Here, "43" (mm) is the diagonal length of the 135 film.

The result of the calculation is shown on the finder display portion 232 by the camera microcomputer 409.

Figure 3:
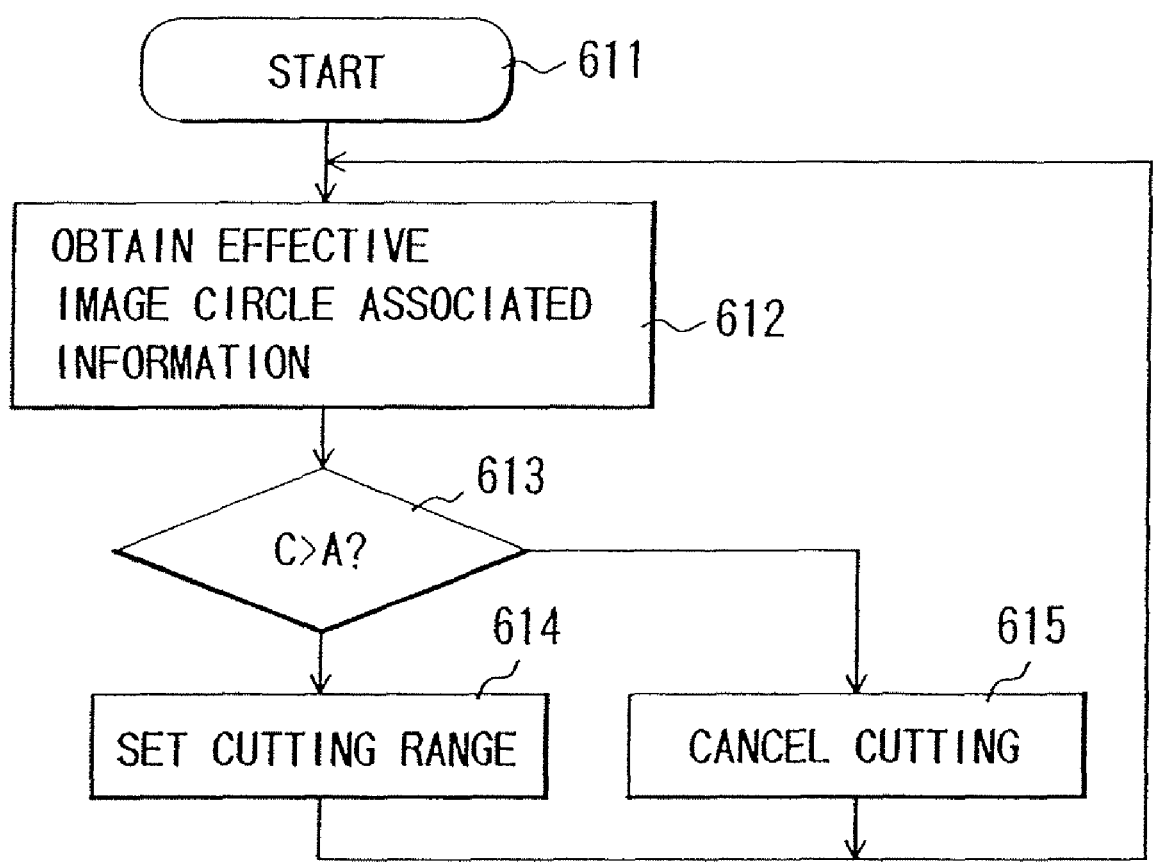
FIG. 3 is a flowchart showing the operation of an imaging system according to a second embodiment of the present invention.

Next, the operation of the camera microcomputer 409 in the present embodiment will be described with reference to the flowchart of FIG. 3.

First, when the operation is started at step 611, at step 612, the effective image circle associated information A of the lens is obtained from the lens side by a communication through contacts (not shown in the Figure) and the communicating portions 508 and 518.

At step 613, the effective image circle diameter A shown by the effective image circle information is compared with the value of the effective diagonal length C of the image pickup device such as a CCD of the camera side. When the effective diagonal length C of the image pickup device is larger as the result of the comparison (the image is eclipsed with the lens), at step 614, a cutting range where the image is not eclipsed is set.

When the effective image circle of the lens side covers the CCD, at step 615, the cutting setting is canceled (when the cutting setting has already been canceled, no processing is performed).

When the electronic camera vibrating compensation is ON, a standard cutting range may be set.

Third Embodiment

Figure 4:
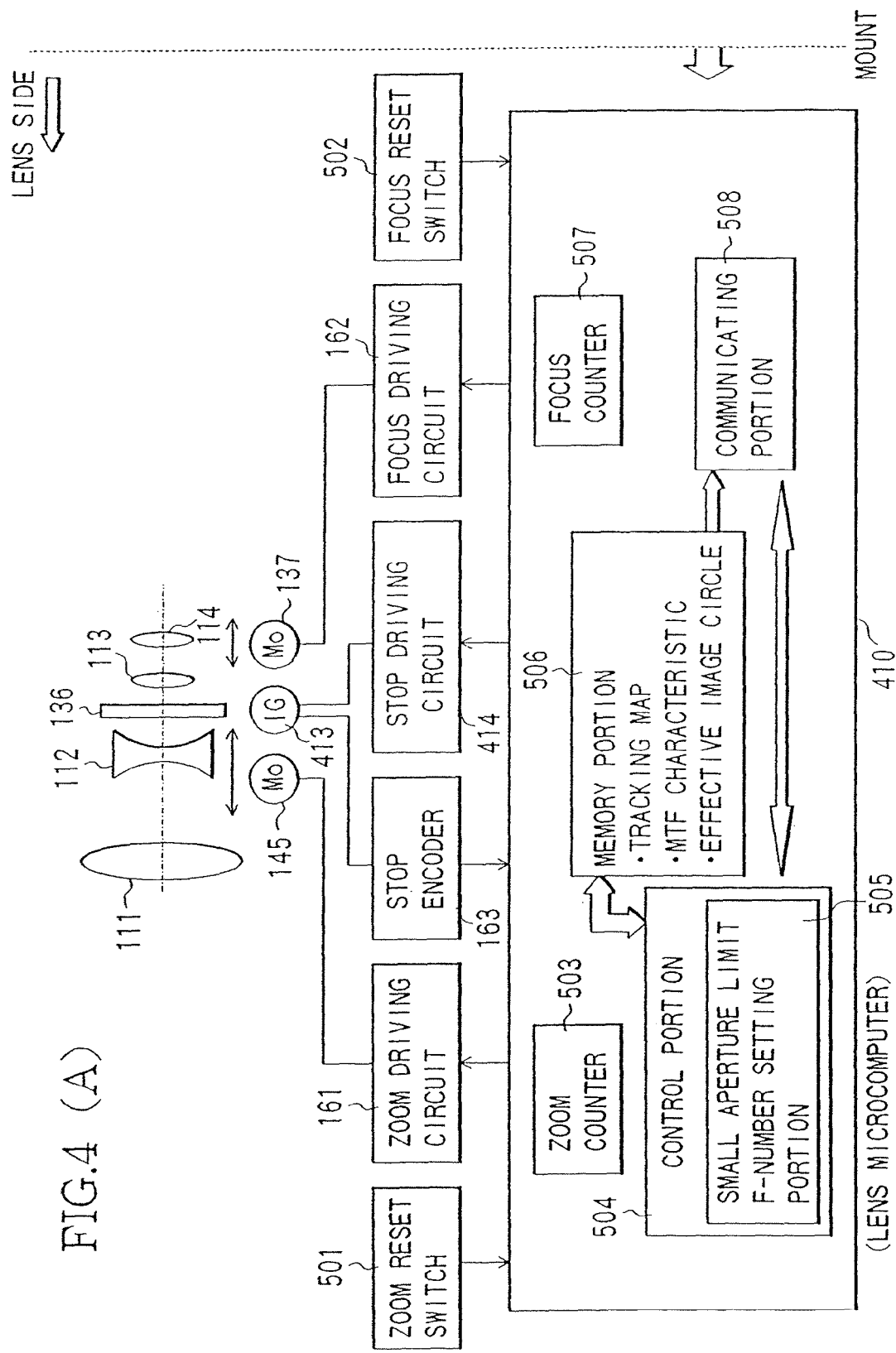
FIGS. 4(A) and 4(B) are block diagrams showing the structure of an imaging system according to a third embodiment of the present invention.

FIGS. 4(A) and 4(B) shows the structure of an imaging system according to a third embodiment of the present invention. In the imaging system of the present embodiment, members the same as those of the imaging system of the first embodiment are designated by the same reference numerals as those of the first embodiment and will not be described again.

In the present embodiment, a vibration sensor 530 is provided on the camera body side. A signal responsive to a vibration of the camera body output from the vibration sensor 530 is taken into the camera microcomputer 409.

As the vibration sensor 530, a piezoelectric vibrating gyro or the like is used. In the present embodiment, two vibration sensors, one for detecting a rotation component in the longitudinal (pitch) direction and one for detecting a rotation component of the lateral (yaw) direction are provided.

According to the conventional electronic vibration compensation, image blur is compensated for by aligning the position of the subject between continuous images by determining (shifting) the position of the range to be cut as an image from the entire effective image plane of the CCD based on the amount of rotation due to a vibration of the camera body or the like obtained from the vibration sensor, the focal length at that time, and the CCD size.

In this case, although no problem arises when the CCD size is sufficiently large, since there is a limit to the CCD size, compensation cannot be completely made for an extremely large angle of vibration, and a twist is added to the cutting method by means of software in the vicinity of the image cutting limit position so that there is no unnaturalness rather in the moving image, whereby a natural image is obtained.

In the present embodiment, in order that no eclipse occurs in the image even when the shooting lens has various effective image circles in a case where the camera body for which the lens is interchangeable has such an electronic vibration compensation function, the range where compensation can be made by the electronic vibration compensation (that is, the range where the image cutting range can be shifted: the shift permissible range), the position on which the above-mentioned software compensation is made, and the like are optimized by using the effective image circle associated information transmitted from the shooting lens side.

In particular, when the effective image circle of the shooting lens varies among the focal lengths and the F-numbers, the electronic vibration compensation is performed based on the information, including those conditions, transmitted from the shooting lens side.

Figure 5:
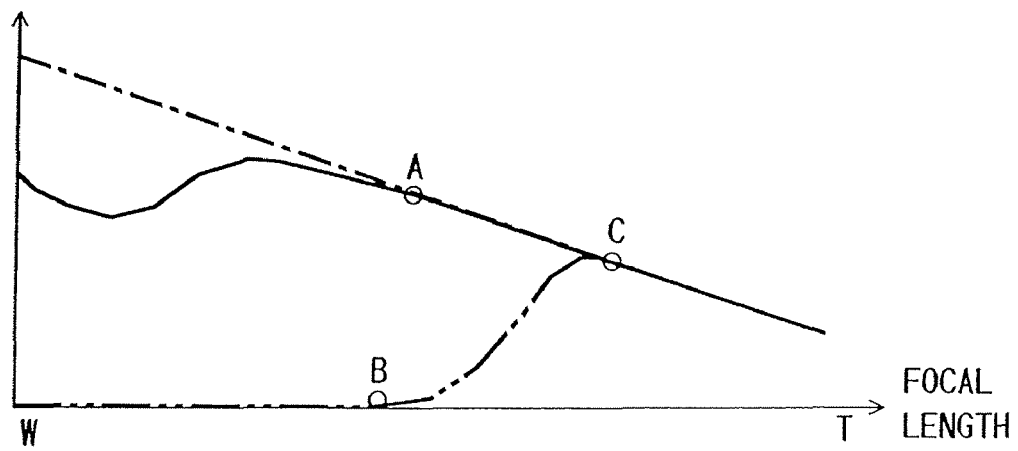
FIG. 5 is a graph showing a relationship between an angle that can be compensated for and a focal length in the third embodiment.

FIG. 5 shows the relationship between the focal length of the shooting lens and the angle of vibration that can be compensated for by the electronic vibration compensation. The horizontal axis of FIG. 5 shows the focal length of the shooting lens, and the vertical axis shows the angle of vibration that can be compensated for by the electronic vibration compensation.

In the electronic vibration compensation, when angle conversion is performed with an assumption that the image cutting range shiftable amount on the CCD is fixed, the closer to the wide side, the larger the maximum angle of vibration that can be compensated for, and the closer to the tele side, the smaller the maximum angle of vibration that can be compensated for.

The alternate long and short dashed line in the figure shows the compensation potential angle of vibration corresponding to each focal length in a case where the effective image circle of the shooting lens is large at any focal length for the effective size of the CCD (in a case where such a camera body and a shooting lens are combined with each other).

The solid line in the figure shows the compensation potential angle of vibration corresponding to each focal length in a case where a camera body and a shooting lens are combined such that the effective image circle is smaller than the entire effective image plane of the CCD although never smaller than the cutting angle of view on the CCD in a range from the wide side to the middle focal length (focal lengths at the points W to A), and the effective image circle of the shooting lens is larger than the effective size of the CCD in a range from the focal length at the point A to the tele side.

In this case, since the maximum angle of vibration that can be compensated for varies among the focal lengths (the image eclipse occurs when the image cutting range shiftable amount on the CCD is fixed), the camera microcomputer 409 limits the shift of the image cutting range so that the image cutting range shifts only within a range corresponding to the maximum angle of vibration that can be compensated for according to the focal length at that time.

As described above, by determining the permissible shift range of the image cutting range corresponding to the focal length from the effective image circle associated information transmitted from the shooting lens, and determining the position of the image cutting range within the permissible shift range based on the output from the vibration sensor and with consideration given so that there is no unnaturalness in the moving image, an electronic vibration compensation function without any image eclipse occurring can be realized while a maximum compensation possible vibration angle corresponding to the focal length at that time is ensured.

While in the characteristics shown by the solid line, the compensation potential angle is a minimum at a focal length slightly on the tele side from the wide side, this depends on the optical design and is merely an example.

In FIG. 5, the chain double-dashed line represents shooting lens-camera body combinations such that the electronic vibration compensation cannot function on the wide side of the point B. The wide side of the point B is a region in which the effective image circle barely covers the image cutting size or in some cases, it is necessary to reduce the cutting size so as to be covered by the effective image circle of the shooting lens.

At points B to C, although the effective image circle is larger than the cutting range, the entire image plane of the CCD is not covered. Therefore, there are cases where compensation for a sufficiently wide angle of vibration cannot be made although the vibration compensation functions.

Between the point C and the tele end, the lens has an effective image circle larger than the entire image plane of the CCD. Therefore, the vibration compensation is made in this range.

As described above, by driving the electronic vibration compensation function and limiting the driving (making the permissible shift range zero) based on the effective image circle associated information of the shooting lens, an electronic vibration compensation function without any image eclipse occurring can be realized while a maximum compensation possible vibration angle in a focal length range where the vibration compensation is possible is ensured.

Next, the operation of the lens microcomputer 410 of the present embodiment and the operation of the camera microcomputer 409 of the present embodiment will be described with reference to the flowchart of FIG. 6 and the flowchart of FIG. 7, respectively.

Figure 6:
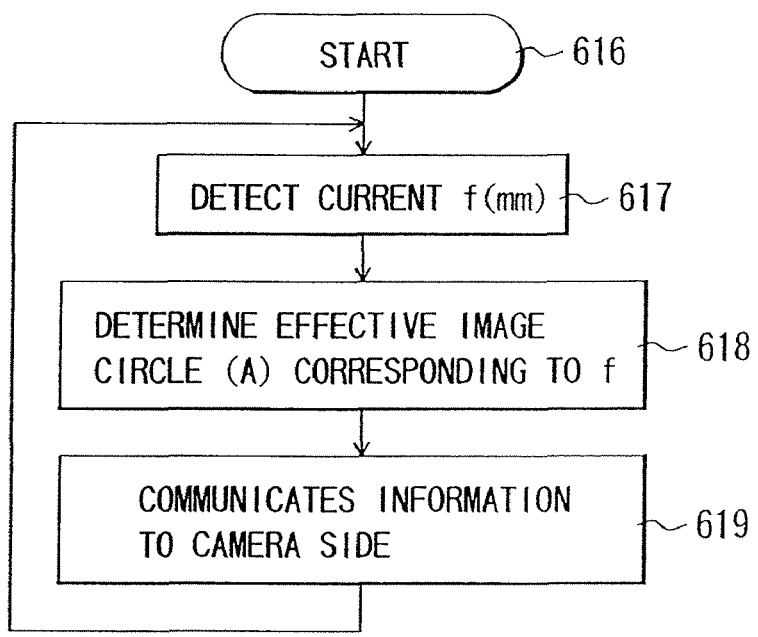
FIG. 6 is a flowchart showing the operation of the imaging system according to the third embodiment of the present invention.

In FIG. 6, when the operation is started at step 616, at step 617, the value of the focal length f set at that time is detected. Then, at step 618, the effective image circle at the value of the focal length f is determined. This is performed by a method such that a table in which a relationship as shown in FIG. 5 is stored is provided in the microcomputer and the effective image circle is read from the table.

Then, at step 619, the effective image circle associated information showing the determined effective image circle is communicated to the camera side microcomputer.

Figure 7:
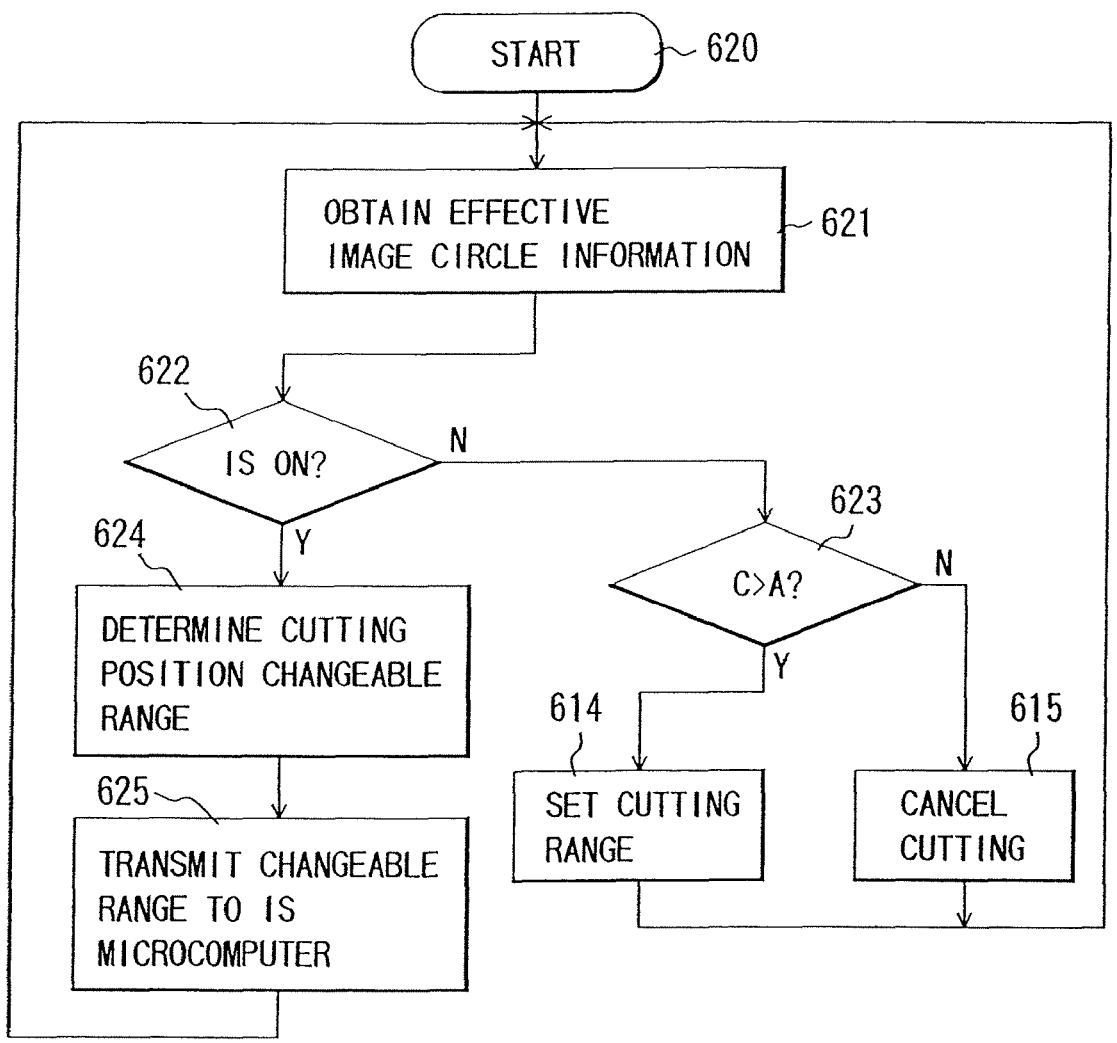
FIG. 7 is a flowchart showing the operation of the imaging system according to the third embodiment of the present invention.

In FIG. 7, when the operation is started at step 620, at step 621, the information of the effective image circle diameter A communicated at step 619 of the flowchart of FIG. 6 is received from the lens side.

At step 622, whether camera vibrating compensation (IS) is ON or not is determined. When it is OFF, the process shifts to step 623. This is equivalent to the shift to step 613 in FIG. 5.

When it is determined at step 622 that IS is ON, at step 624, how far the cutting position can be shifted upward, downward, rightward and leftward from the center is determined, for example, based on the number of scanning lines or the number of pixel strings. Then, the range where the cutting position can be shifted without the image being eclipsed is determined from the effective image circle diameter A. At this time, the values of the effective image circle diameter A and the CCD diagonal length information C are used.

Then, at step 625, a value as to how much the cutting position can be changed is transmitted to an IS microcomputer (camera microcomputer 409) controlling the camera vibrating compensation function. Based on this value, the IS microcomputer (camera microcomputer 409) performs a control as described above such that there is no unnaturalness in the moving image.

As described above, according to the above-described embodiments, since the data size for recording the shot image is changed based on the information associated with the MTF received from the shooting lens apparatus, the image can be recorded in a data size (file size) being optimum, that is, without any waste for which the data size corresponds to the resolution performance of the attached lens apparatus, so that efficient image recording can be performed.

When the data size or the image definition can be selected by the user, by causing a warning operation to be performed when the data size selected by the user or the data size corresponding to the image definition is larger than the data size set based on the information associated with the MTF received by the controlling means, the user can be reliably notified that the shooting is inefficient.

Moreover, according to the above-described embodiments, since the adjustment range of the light quantity adjusting means provided in the shooting lens apparatus is changed based on the information associated with the MTF received from the shooting lens apparatus, high-quality images can be recorded by causing the shooting lens to adjust the light quantity within an optimum range corresponding to the resolution performance of the attached lens apparatus, for example, a range where no small aperture diffraction is caused.

In the above-described embodiments, when the MTF associated information received from the shooting lens apparatus is information corresponding to at least one of the focal length and the F-number of the shooting lens apparatus, more efficient shooting can be performed.

Moreover, according to the above-described embodiments, since the size of the image acquisition range on the image pickup device is changed based on the information associated with the effective image circle received from the shooting lens apparatus, the image can be recorded in an image acquisition range corresponding to the effective image circle of the attached shooting lens apparatus for which the image acquisition range is optimum, that is, without any waste and has a size where the image is not eclipsed, so that efficient image recording without any eclipse occurring can be performed.

Moreover, according to the above-described embodiments, since the permissible shift range where the image acquisition range can be shifted on the image pickup device for electronic image vibration compensation is changed based on the information associated with the effective image circle received from the shooting lens apparatus, a maximum permissible shift range corresponding to the effective image circle of the attached lens apparatus for which the permissible shift range is optimum, that is, without any waste and with no image eclipsed can be set, so that effective vibration compensation without any eclipse occurring can be made.

When the information associated with the effective image circle received from the shooting lens apparatus is information associated with the effective image circle corresponding to at least one of the focal length and the F-number of the lens device, more effective image vibration compensation can be made.

What is claimed is:

1. A camera body to which a shooting lens is interchangeably attached, said camera body comprising:
 an image pickup device;
 a controller configured to set a use limit F-number for a light quantity adjusting unit in the attached shooting lens, based on (a) MTF characteristic data corresponding to at least one focal length and at least one F-number of the attached shooting lens, which is received from the attached shooting lens, and (b) information of a pixel pitch of the image pickup device, the pixel pitch being defined as the spacing between individual, adjacent pixels in horizontal and vertical directions,
 wherein the controller is configured to set the use limit F-number to be larger in a case where the pixel pitch of the image pickup device is large than in a case where the pixel pitch of the image pickup device is small.

2. An image taking system comprising:
 a camera body according to claim 1; and
 a shooting lens attachable to the camera.

3. A camera body according to claim 1, further comprising a memory,
 wherein the information of a pixel pitch of the image pickup device is stored in the memory.

4. A camera body according to claim 3, wherein information of the number of pixels of the image pickup device is also stored in the memory.

5. A camera body according to claim 4, wherein information of the size of the image pickup device is also stored in the memory.

6. A camera body according to claim 1, wherein in the case where the pixel pitch of the image pickup device is large and in the case where the pixel pitch of the image pickup device is small, the image pickup device is of the same size but the number of pixels is different.

* * * * *